US012668737B2

(12) United States Patent
DeNolf et al.

(10) Patent No.: US 12,668,737 B2
(45) Date of Patent: Jun. 30, 2026

(54) MULTILAYER LOW CURRENT ELECTRO-OPTIC ASSEMBLY

(71) Applicant: GENTEX CORPORATION, Zeeland, MI (US)

(72) Inventors: Garret C. DeNolf, Grand Rapids, MI (US); Caleb Knust, Holland, MI (US); Leroy J. Kloeppner, Jenison, MI (US); Punam Giri, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 588 days.

(21) Appl. No.: 18/170,587

(22) Filed: Feb. 17, 2023

(65) Prior Publication Data

US 2023/0266631 A1 Aug. 24, 2023

Related U.S. Application Data

(60) Provisional application No. 63/311,594, filed on Feb. 18, 2022.

(51) Int. Cl.
*C09K 9/02* (2006.01)
*G02F 1/1524* (2019.01)

(52) U.S. Cl.
CPC .............. *C09K 9/02* (2013.01); *G02F 1/1524* (2019.01)

(58) Field of Classification Search
CPC ........... G02F 1/15; G02F 1/155; G02F 1/1524
See application file for complete search history.

(56) References Cited

U.S. PATENT DOCUMENTS

| | | | | |
|---|---|---|---|---|
| 6,020,987 A | * | 2/2000 | Baumann | C09K 9/02 359/273 |
| 7,835,059 B2 | * | 11/2010 | Giri | G02F 1/163 359/275 |
| 10,971,718 B2 | | 4/2021 | Theiste et al. | |
| 11,079,647 B2 | | 8/2021 | Ura et al. | |
| 11,180,950 B2 | | 11/2021 | Kubo et al. | |
| 2005/0259310 A1 | | 11/2005 | Giri et al. | |

(Continued)

FOREIGN PATENT DOCUMENTS

| | | |
|---|---|---|
| EP | 1457813 B2 | 9/2004 |
| JP | 2009009145 A | 1/2009 |

(Continued)

*Primary Examiner* — Bijan Ahvazi
(74) *Attorney, Agent, or Firm* — Price Heneveld LLP; Brian James Brewer

(57) ABSTRACT

An electro-optic assembly includes a first substrate and a second substrate that is disposed in a substantially parallel spaced apart relationship with the first substrate. A first conductive layer is disposed on the first substrate, and a second conductive layer is disposed on the second substrate. A cathodic electro-optic film is in contact with the second conductive layer and includes a cathodic species. An anodic electro-optic film is in contact with the first conductive layer. The anodic electro-optic film includes a plurality of anodic species mixed at a molar ratio that is configured to generally maintain an a* value and a b* value of the electro-optic assembly both staying between −8 and 8 between a high-end transmission state and a fully darkened state caused by an applied voltage range. An electrolyte medium is disposed between the cathodic and anodic electro-optic films.

19 Claims, 17 Drawing Sheets

(56) References Cited

U.S. PATENT DOCUMENTS

| | | | |
|---|---|---|---|
| 2017/0355901 | A1 | 12/2017 | Branda et al. |
| 2020/0050070 | A1 | 2/2020 | Theiste et al. |
| 2020/0379309 | A1 | 12/2020 | Erno et al. |
| 2021/0318584 | A9 * | 10/2021 | Erno .................... G02F 1/1514 |

FOREIGN PATENT DOCUMENTS

| | | | |
|---|---|---|---|
| JP | 2012511167 | A | 5/2012 |
| KR | 1020180088218 | A | 8/2018 |

* cited by examiner

Anodic Variety One – Non-Substituted (66)

FIG. 5

Anodic Variety Two - Substituted (68)

FIG. 8

Anodic Electro-Optic Film (44) with a Single Anodic Variety Two (68) in Darkened State \* N,N'-bis(6-hydroxyhexyl)-4,4'-bypyridinium di(bis(trifluoromethane) sulfonimide)

\*\* 5,10-bis[4-(3-hydroxypropyl dimethylammonio)butyl] 2,7-di(tert-butyl)-5,10-dihydro phenazine bis(trifluoromethanesulfonate)

\*\*\* 5,10-bis[4-(3-hydroxypropyl dimethylammonio)butyl] 5,10-dihydro phenazine bis(trifluoromethanesulfonate)

Cathodic Film Formulation

| | | |
|---|---|---|
| Solvents | Propylene Carbonate | 29wt% |
| | 3-Methoxypropionitrile | 54wt% |
| Electrochromic Material | * | 12.3wt% |
| Crosslinker | Desmodur N3300A | 4.7wt% |
| Surfactant | TEGO Glide 410 | 0.02wt% |
| Catalyst | Dibutyltin Diacetate | 100ppm |

Anodic Film Formulation

| | | |
|---|---|---|
| Solvents | Propylene Carbonate | 45.06wt% |
| | Cyclohexanone | 18.03wt% |
| | Diacetone Alcohol | 13.52wt% |
| | Ethylene Glycol Diacetate | 9.01wt% |
| | Butyldiglycol Acetate | 4.51wt% |
| Electrochromic Material | ** | 4.98wt% |
| | *** | 1.39wt% |
| Crosslinker | Desmodur N3300A | 3.49wt% |
| Surfactant | TEGO Glide 410 | 0.02wt% |
| Catalyst | Dibutyltin Diacetate | 100ppm |

FIG. 11

Full Electro-Optic Assembly (10) including Anodic Electro-Optic film (44) with a Single Anodic Variety One (66) and a Single Anodic Variety Two (68) in Darkened State with a 60:40 Molar Ratio of Variety One (66): Variety Two (68)

Full Electro-Optic Assembly (10) including Anodic Electro-Optic film (44) with a Single Anodic Variety One (66) and a Single Anodic Variety Two (68) in Darkened State with a 80:20 Molar Ratio of Variety One (66): Variety Two (68)

| Anodic Type in Assembly 10 | Powered Voltage | Unpowered Transmission (%) | Powered Transmission (%) | Powered a* | Powered b* |
|---|---|---|---|---|---|
| Variety 1 (66B, X=PF₆) | 0.7 | 86.1 | 25.9 | -10.9 | 2.1 |
| | 0.6 | 86.1 | 31.2 | -11.6 | 2.1 |
| | 0.5 | 86.1 | 60.4 | -10.4 | 2.0 |
| Variety 2 (68C, X=PF₆) | 0.7 | 85.2 | 20.6 | 6.6 | -4.0 |
| | 0.6 | 85.2 | 21.1 | 6.3 | -3.7 |
| | 0.5 | 85.2 | 30.8 | 2.6 | -1.8 |
| | 0.4 | 85.0 | 66.0 | -3.6 | 1.8 |
| 65:35 molar ration (66B:68C) | 0.7 | 85.9 | 11.5 | 2.8 | 0.6 |
| | 0.6 | 85.9 | 14.8 | 1.6 | 0.7 |
| | 0.5 | 85.8 | 35.0 | -1.6 | 0.2 |
| | 0.4 | 85.9 | 66.9 | -4.0 | 1.2 |

FIG. 14

MULTILAYER LOW CURRENT ELECTRO-OPTIC ASSEMBLY

CROSS-REFERENCE TO RELATED APPLICATION

This application claims priority to and the benefit under 35 U.S.C. § 119(e) of U.S. Provisional Patent Application No. 63/311,594, filed on Feb. 18, 2022, entitled "MULTI LAYER LOW CURRENT ELECTROCHROMIC ASSEM-BLY," the disclosure of which is hereby incorporated herein by reference in its entirety.

FIELD OF THE DISCLOSURE

The present disclosure generally relates to an electro-optic assembly, and, more particularly, to an electro-optic assembly with variable transmission that maintains a stable, neutral color during and after a change in transmission.

SUMMARY OF THE DISCLOSURE

According to one aspect of the present disclosure, an electro-optic assembly includes a first substrate that has a first and a second surface disposed on opposite sides thereof and a second substrate that has a third and a fourth surface disposed on opposite sides thereof. The second substrate is disposed in a substantially parallel spaced apart relationship with the first substrate such that the second and third surfaces face one another. A first conductive layer is disposed on the second surface and a second conductive layer is disposed on the third surface. A cathodic electro-optic film is in contact with the second conductive layer and includes a cathodic species. An anodic electro-optic film is in contact with the first conductive layer. The anodic electro-optic film includes a plurality of anodic species mixed at a molar ratio that is configured to generally maintain an a* value and a b* value of the electro-optic assembly both staying between −8 and 8 between a high-end transmission state and a fully darkened state caused by an applied voltage range. An electrolyte medium is disposed between the cathodic and anodic electro-optic films.

According to another aspect of the present disclosure, an electro-optic assembly includes a first substrate that has a first and a second surface disposed on opposite sides thereof and a second substrate that has a third and a fourth surface disposed on opposite sides thereof. The second substrate is disposed in a substantially parallel spaced apart relationship with the first substrate such that the second and third surfaces face one another. A first conductive layer is disposed on the second surface and a second conductive layer is disposed on the third surface. A cathodic electro-optic film is in contact with the second conductive layer and includes a cathodic species. An anodic electro-optic film is in contact with the first conductive layer. The anodic electro-optic film includes a plurality of anodic species mixed at a molar ratio that is configured to generally maintain an a* value and a b* value of the electro-optic assembly both staying between −8 and 8 between a high-end transmission state and a fully darkened state caused by an applied voltage range. The plurality of anodic species includes a first anodic species and a second anodic species, where the first anodic species comprises the molar percentage between 80% and 60% of an aggregation of the first anodic species and the second anodic species. An electrolyte medium is disposed between the cathodic and anodic electro-optic films.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 5 is a schematic view of a first variety (non-substituted) of anodic species that may be selected for the anodic electro-optic film according to an aspect of the present disclosure;

FIG. 8 is a schematic view of a second variety (substituted in a 2,7 or 2,8 position) of anodic species that may be selected for the anodic electro-optic film according to an aspect of the present disclosure;

FIG. 11 is a table that provides specific example formulations of the anodic electro-optic film and the cathodic electro-optic film prior to deposition according to an aspect of the present disclosure;

FIG. 14 is a table summarizing performance metrics of the electro-optic assembly compared to electro-optic devices with only one anodic species according to an aspect of the present disclosure;

DETAILED DESCRIPTION

Figure 1:
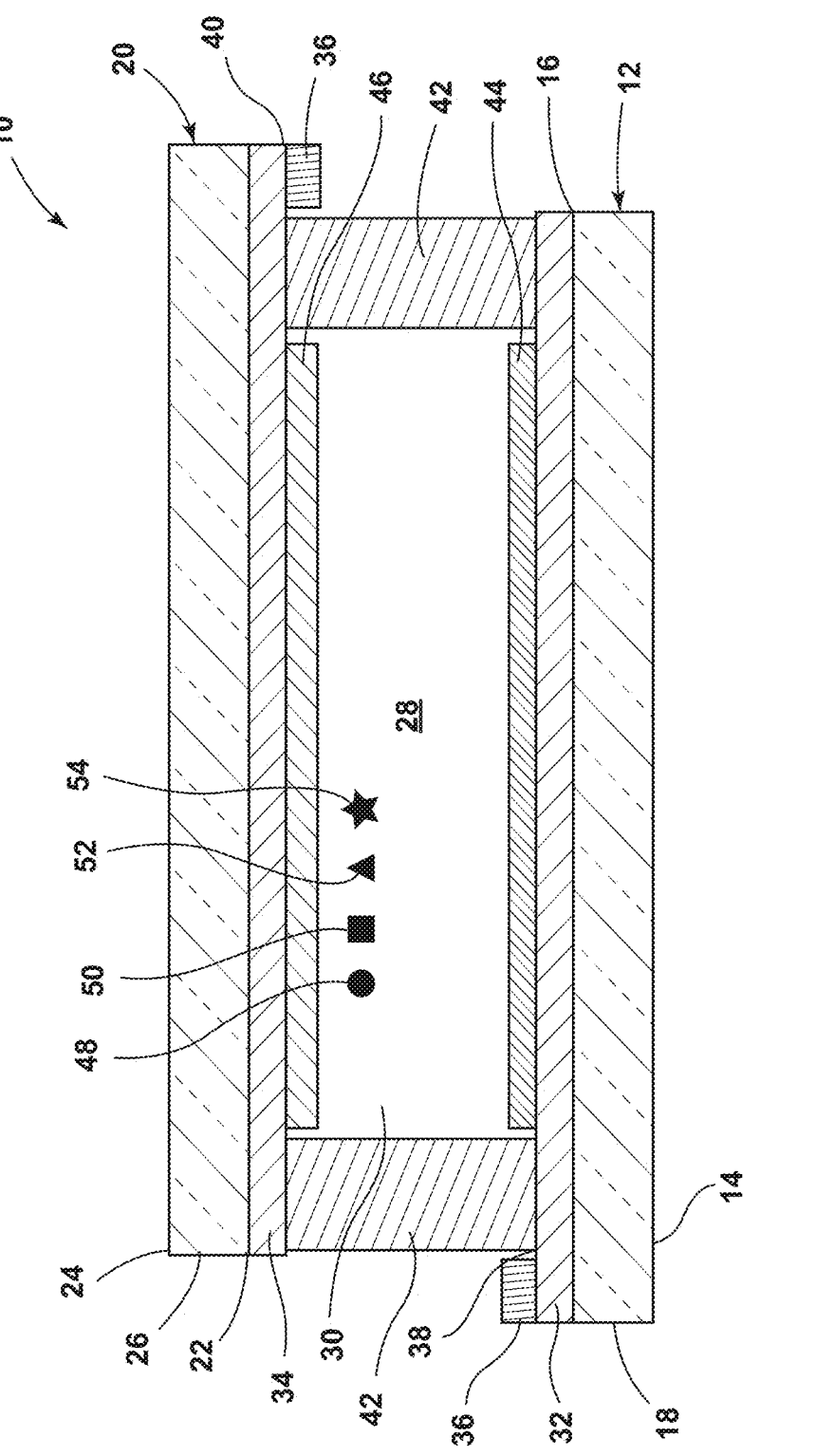
FIG. 1 is a cross-sectional view of an electro-optic assembly according to an aspect of the present disclosure.

The present illustrated embodiments reside primarily in combinations of method steps and apparatus components related to an electro-optic assembly with variable transmission that maintains a stable, neutral color during and after a change in transmission. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

The present disclosure generally relates to an electro-optic system that includes a multi-layer configuration having low current requirements for holding specific transmission states within a variety of different transmission states. The different transmission states are achieved by applying a specific external electrical potential across first and second conductive layers, which results in an absorbance change in an anodic electro-optic film and a cathodic electro-optic film. The different transmission states remain color neutral during the transition between the device's different transmission states. In addition, the different transmission states remain stable over an extended period of time when the electro-optic assembly is left at an open circuit state. The electro-optic system includes at least two anodic species.

Referring initially to FIG. 1, reference numeral 10 generally designates an electro-optic assembly (e.g., electrochromic). In various embodiments, the electro-optic assembly 10 may be implemented in a window, display device, sunroof, optical filter, eye glasses, mirrors, and a variety of other applications that may benefit from varying a transmittance of light through one or more substrates. The embodiments shown in the drawings are depicted with generally flat substrates, however, it is understood that the disclosure is not limited to flat substrates. The substrates may be flat, bent, curved, or combinations of these shapes without deviating from the spirit of the disclosure. The electro-optic assembly 10 includes a first substrate 12 defining a first surface 14, a second surface 16, and a first peripheral edge 18. The first substrate 12 may be substantially transparent. The electro-optic assembly 10 also includes a second substrate 20 defining a third surface 22, a fourth surface 24, and a second peripheral edge 26. The second substrate 20 may also be substantially transparent. The first substrate 12 and the second substrate 20 are disposed in a parallel and spaced apart relationship with the second surface 16 and the third surface 22 facing each other so as to define a cavity 28 therebetween. The first substrate 12 and the second substrate 20 may be formed of glass (e.g., soda-lime glass or borosilicate glass), plastics, ceramics, metal, combinations thereof, and/or the like.

An electrolyte medium 30 at least partially fills the cavity 28. The electrolyte medium 30 includes an ion-conducting substance, such as a solvent containing electrolytes, other non-gelling electrolytes, and electrolyte gels or solids. The electrolyte may include an ionic salt for ionic conductivity, have a cation of tetramethylammonium, tetraethylammonium, tetrabutylammonium and may have an anion or a counterion selected from a group comprising $F^-$, $Cl^-$, $Br^-$, $I^-$, $BF_4^-$, $PF_6^-$, $SbF_6^-$, $AsF_6^-$, $ClO_4^-$, $SO_3CF_3^-$, $N(CF_3SO_2)_2^-$, $C(CF_3SO_2)_3^-$, $N(SO_2C_2F_5)_2^-$, $Al(OC(CF_3)_3)_4^-$, $BAr_4^-$, or mixtures of anions thereof, where Ar is an aryl or fluorinated aryl group. In some embodiments, the anion is selected from group comprising $PF_6^-$ and/or $SO_3CF_3^-$. By way of non-limiting examples, the anion may be tetraethylammonium hexafluorophosphate, and/or other ion-conducting substances like polymer binders, solvents, plasticizers, and UV stabilizers. A first conductive layer 32 may be disposed on the second surface 16 of the first substrate 12 and a second conductive layer 34 may be disposed on the third surface 22 of the second substrate 20. In other words, the first conductive layer 32 and the second conductive layer 34 may be located on internal surfaces of the first and second substrates 12, 20 facing the cavity 28. The first conductive layer 32 and the second conductive layer 34 may be formed of electrically conductive transparent materials, including, but not limited to, a conductive oxide, such as a transparent metal oxide (e.g., Indium Tin Oxide ("ITO"), Tin Oxide ("SnO2"), Zinc Oxide ("ZnO"), Indium Zinc Oxide ("IZO")), intermetallic-metal-intermetallic ("IMI") structures, carbon (graphene and/or graphite), and/or a conductive metal mesh (e.g., nanowires).

An electric bus 36 may include segments that at least partially travel along a peripheral edge of the cavity 28 on the first conductive layer 32 and the second conductive layer 34. For example, the electric bus 36 may include a conductive adhesive, tape, and/or the like, that may include a higher electric conductivity than one or both of the first and second conductive layers 32, 34. The electric bus 36 may include segments placed on an internal surface (e.g., a surface that faces towards the cavity 28) of the first conductive layer 32 and/or the second conductive layer 34 or the electric bus 36 may include segments placed on an outer surface (e.g., a surface that faces away from the cavity 28) of the first conductive layer 32 and/or the second conductive layer 34. In some instances, the electric bus 36 may include a segment that transverses an entire outboard perimeter of the cavity 28 on the first conductive layer 32 and a segment that transverses an entire outboard perimeter of the cavity 28 on the second conductive layer 34. In some instances, segments of the electric bus 36 may be localized to one or more alternative locations. The first peripheral edge 18 of the first substrate 12 and the second peripheral edge 26 of the second substrate 20 may be misaligned such that the first substrate 12 defines a first overhang portion 38 that extends past the second peripheral edge 26, and the second substrate 20 defines a second overhang portion 40 that extends past the first peripheral edge 18. In some embodiments, the first conductive layer 32 may extend along part of the first overhang portion 38 and a segment of the electric bus 36 may be at least partially located on the first conductive layer 32 over the first overhang portion 38. In some embodiments, the second conductive layer 34 may extend along part of the second overhang portion 40 and a segment of the electric bus 36 may be at least partially located on the second conductive layer 34 over the second overhang portion 40. However, it should be appreciated that, in some embodiments, the substrates 12, 20 may be aligned (i.e., without overhang portions 38, 40).

A seal 42 may include a substantially continuous line outlining a periphery of the cavity 28 to retain the electrolyte medium 30, the anodic electro-optic film 44, and the cathodic electro-optic film 46 between the first substrate 12 and the second substrate 20 in an inboard direction. The seal 42 may have a seal medium, such as an epoxy, acrylic, and/or the like. The seal 42 may be located inboard from the electric bus 36. In other words, the first conductive layer 32 and/or the second conductive layer 34 may include outer peripheral edges that extend past the seal 42. For example, the seal 42 may be located inboard of both the first overhang portion 38 and the second overhang portion 40 and spaced inboard from the electric bus 36. However, it should be appreciated that, in other arrangements, the seal 42 may substantially cover and/or be aligned with the electric bus 36 or be located elsewhere.

With continued reference to FIG. 1, the electro-optic assembly 10 further includes an anodic electro-optic film 44 and a cathodic electro-optic film 46. The anodic electro-optic film 44 is located on (e.g., in contact) an inner surface of the first conductive layer 32 such that it interfaces with the electrolyte medium 30. The cathodic electro-optic film 46 is located on (e.g., in contact) an inner surface of the second conductive layer 34 such that it similarly interfaces with the electrolyte medium 30. In other words, the electrolyte medium 30 may be sandwiched between both the anodic electro-optic film 44 and the cathodic electro-optic film 46. The anodic electro-optic film 44 and the cathodic electro-optic film 46 may be deposited on the first and second conductive layers 32, 34 via any number of processes. For example, the anodic electro-optic film 44 and the cathodic electro-optic film 46 may be formed by depositing on the conductive layers 32, 34 materials that form an electro-optic film (e.g., a memory electro-optic film) along with a coating solvent, leveling agents, and/or the like. The anodic electro-optic film 44 and the cathodic electro-optic film 46 are configured to provide a substantially color neutral optical switching between varying transmission states and the fully darkened state. For example, the anodic electro-optic film 44 may include a plurality of anodic species (i.e., the moiety to be oxidized) including at least a first anodic species and a second anodic species. Generally, the embodiments disclosed herein will include at least two anodic species and a cathodic species for a total of at least three species. In various embodiments, the anodic species and the cathodic species have varying absorption spectra, when electrically activated, such that when aggregated the color of the electro-optic assembly 10 remains at a neutral and stable color throughout varying transmission states.

The varying transmission is due to one electron per cathodic species reduction or one electron per anodic species oxidation which is accompanied by a change from a high transmission state (e.g., of a clear state in a range of about 40-95%) or relatively clear and colorless to a low transmission state or fully darkened state (e.g., a darkened state range of about 0.001%-30% or 0.001%-10%). Generally, the total number of anodic species that are oxidized must be equal to or less than the total number of cathodic species. In order to maintain the pre-selected perceived color during darkening and clearing transitions, all of the anodic species should have similar redox potentials to each other and all of the cathodic species should have similar redox potentials to each other. The redox potentials of each anodic species may be within 200 mV or less of each other, for example, 150 mV or less, 100 mV or less, or 50 mV or less to retain color neutral stability between transmission states.

In various examples, the anodic electro-optic film 44 may include a polymer matrix film and the anodic species are bound to the polymer matrix film and surface confined therein. In various examples, the cathodic electro-optic film 46 may include a polymer matrix film and the cathodic species are bound to the polymer matrix film and surface confined therein. Because many optional cathodic species include a viologen densely concentrated in the polymer matrix film, difficulties arise in obtaining neutral coloring as a result of dimerization of the viologen, often turning the cathodic electro-optic film 46 shades of red (a* positive) on electrochemical reduction. The color neutrality is accomplished, in part, by mixing a ratio of two or more of the anodic species. Neutrality is also accomplished by maintaining excess molarity of cathodic species more than the anodic species. The species chosen and the ratio between species correlate to the extent of neutrality throughout the changes in transmission. The anodic species and the cathodic species may be mixed in a solvent prior to deposition. As such, the anodic electro-optic film 44 may be a homogenous layer with uniform concentrations of the two or more anodic species and the cathodic electro-optic film 46 may be a homogenous layer with uniform concentrations of the cathodic species. It should be appreciated that, in some embodiments, two or more electro-optic assemblies 10 may be stacked, where the two or more electro-optic assemblies 10 would combine to include at least three species or at least four species that include at least two anodic species and the cathodic species (not shown).

Figure 15:
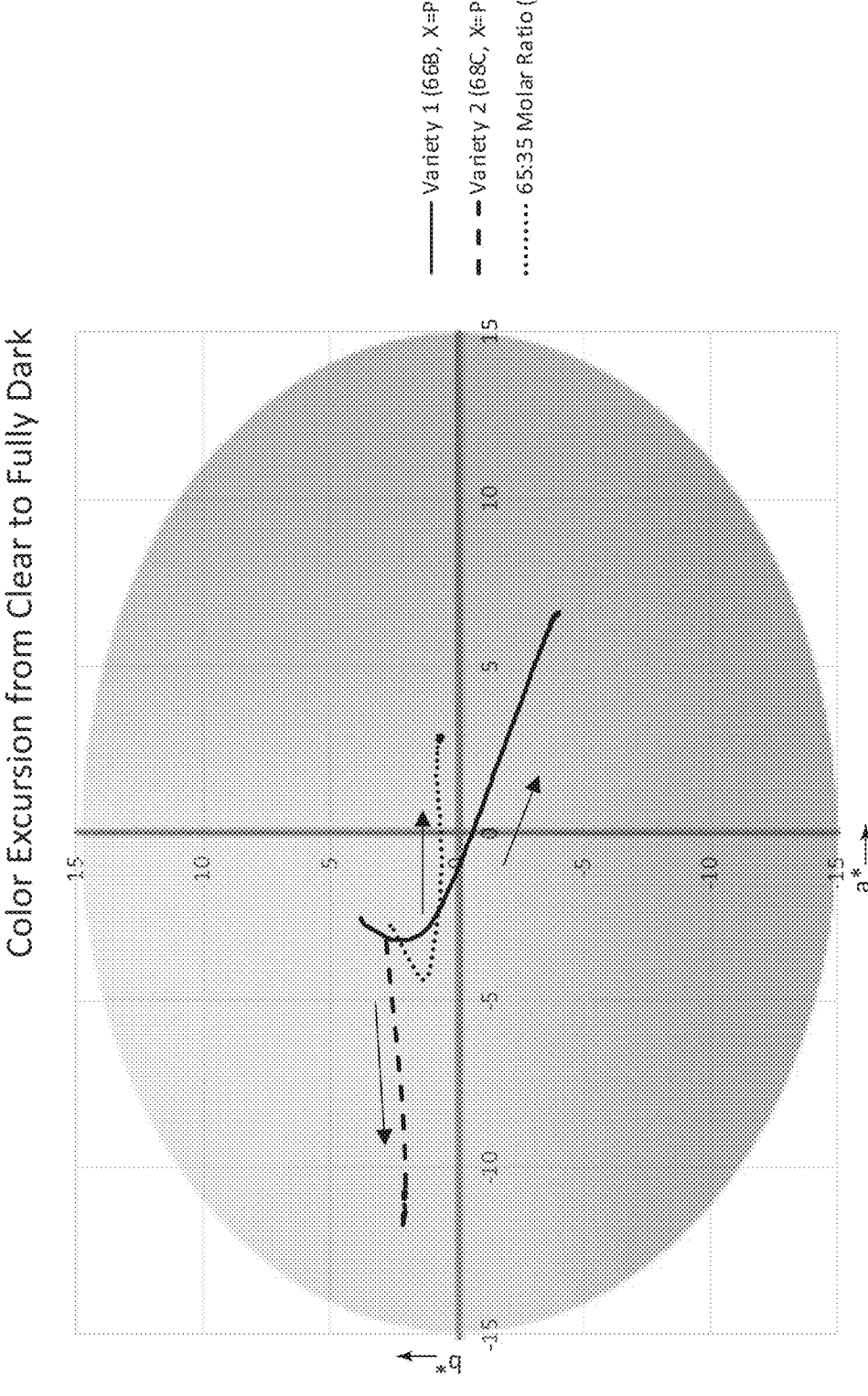
FIG. 15 is color excursion graph of the electro-optic assembly from a clear to a fully dark transition according to an aspect of the present disclosure.
Figure 16:
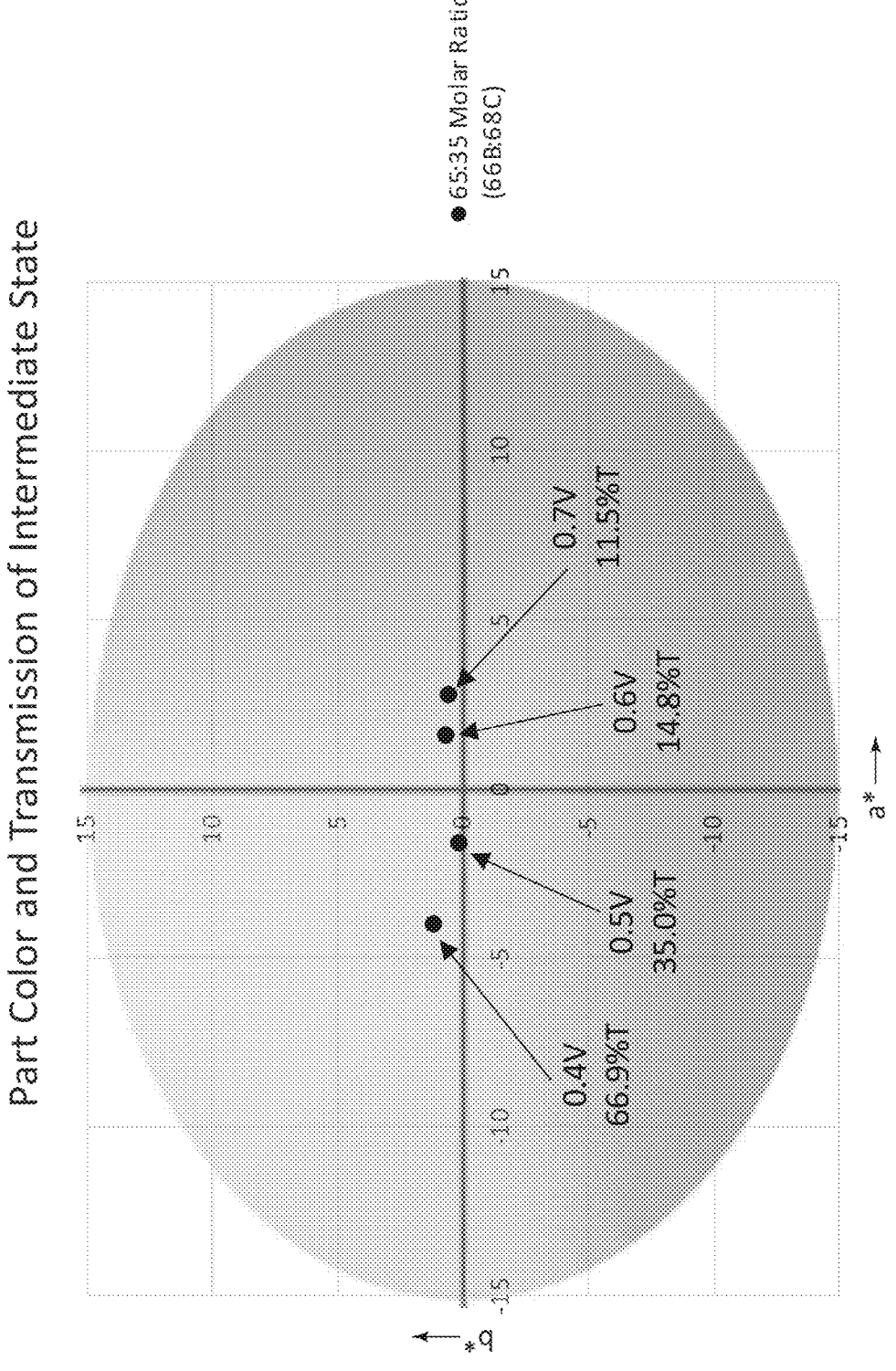
FIG. 16 is color excursion graph of the electro-optic assembly at varying applied voltages according to an aspect of the present disclosure.
Figure 17:
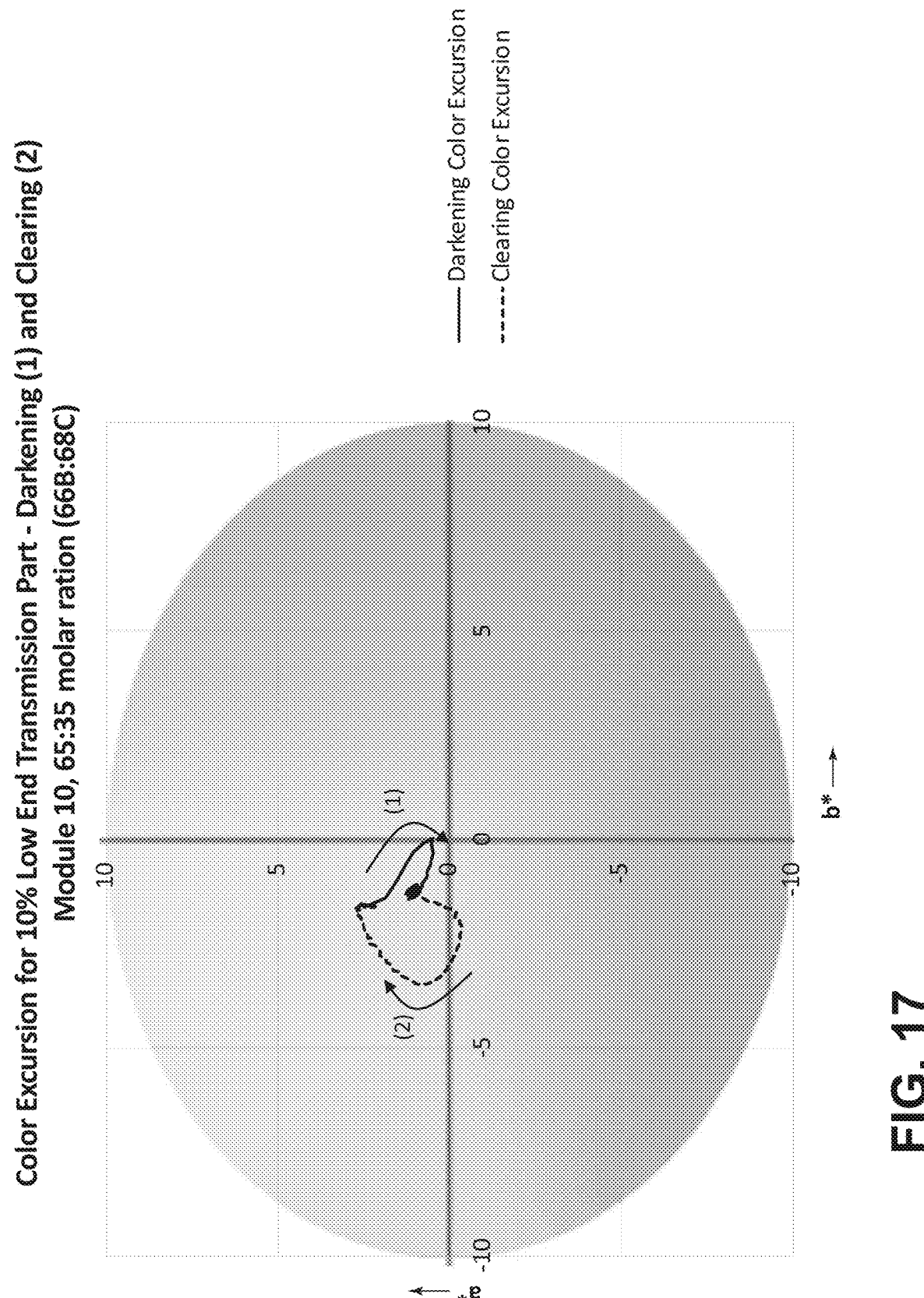
FIG. 17 is color excursion graph of the electro-optic assembly at varying transmission ranges according to an aspect of the present disclosure.

In discussing colors, it is useful to refer to the Commission Internationale de l'Eclairage's (CIE) 1976 CIELAB Chromaticity Diagram (commonly referred to as the L*a*b* chart) as generally shown with a* and b* values in FIGS. 15-17. On the L*a*b* chart, L* defines lightness, a* denotes the red/green value, and b* denotes the yellow/blue value. The electro-optic assembly 10 has an absorption spectra at each particular voltage that may be converted to a three number designation, its L*a*b* values. As discussed herein, the term "color neutrality" may be defined as a maintained a* value between −8 and 8, for example between −6 to 6, between $-6<a^*<6$, between −5 to 5, between $-5<a^*<5$, between −4 to 4, or between $-4<a^*<4$ or less and a maintained b* value between −8 and 8, for example between −6 to 6, between $-6<b^*<6$, between −5 to 5, between $-5<b^*<5$, between −4 to 4, or between $-4<b^*<4$ or less when the electro-optic assembly 10 is changed to the fully darkened state from an application of an applied voltage. These values may also be maintained across an applied voltage range (e.g., low-to-high transmission state, high-to-low transmission states, and/or intermediate transmission states). Moreover, it is important for the electro-optic assembly 10 to exhibit color stability. Color stability is a color change as a function of time. Stated another way, color stability may be defined as specific ranges of a total color excursion of the a* value and the b* value as the electro-optic assembly 10 is changed from a fully clear, high transmission state to the fully darkened state, including intermediate states, or the reverse (e.g., low-to-high transmission state). Therefore, color stability may be defined as a total color excursion of the a* value between −10 and 10, for example between −8 and 8 or −8<a*<8 and total color excursion of the b* value between −10 and 10, for example between −8 and 8 or −8<b*<8 from an application of an applied voltage or applied voltage range.

Once a transmission state is obtained, the electro-optic assembly 10 has a memory that remains color neutral and stable over an extended period of time when the electro-optic assembly 10 is left in an open circuit or until the voltage is reversed or the system is shorted. In operation, the injection of electrons in the cathodic (reduction) and removal of electrons in the anodic (oxidation) is localized to the individual films (e.g., the anodic electro-optic film 44 and the cathodic electro-optic film 46) and the opposite charges cannot recombine due to the separation of the cathodic and the anodic into two separate layers by the electrolyte medium 30. The change in charge of each layer or film from the injection and removal of electrons (cathodic and anodic, respectively) is offset by migration of the electrolyte counter ions between the two layers or films. Testing has shown that the electro-optic assembly 10 can remain in a preselected transmission state with neutral coloring for weeks. The applied voltage range may be associated with a low draw current range that results from the applied voltage or open circuit potential. Therefore, the electro-optic assembly 10 may have a low draw current range requirement. The low current range may be defined as less than 1 micro-amp per square centimeter.

With reference now to FIGS. 1-8, various material examples are provided for the electrolyte medium 30, the anodic electro-optic film 44, and the cathodic electro-optic film 46. In the provided examples, the anodic electro-optic film 44 includes a plurality of anodic species that includes a first anodic species and a second anodic species and the cathodic electro-optic film 46 includes at least one cathodic species. However, it should be appreciated that the material examples are exemplary in nature and a wide variety of the alternative materials may be substituted and synthesized to provide a similar color neutrality and stability as those examples provided below.

With continued reference to FIGS. 1-8, material examples of the electrolyte medium 30 are provided in accordance with various embodiments. The electrolyte medium 30 may be formed as an electrolyte film and/or gel that includes a first electrolyte salt 48, an electrolyte crosslinker 50 (i.e., a first crosslinker), an electrolyte polymer 52, and an electrolyte solvent 54. In some embodiments, the first electrolyte salt 48 may include a cation of tetramethylammonium, tetraethylammonium, tetrabutylammonium and may have an anion of anion selected from a group comprising F−, Cl−, Br−, I−, BF$_4$−, PF$_6$−, SbF$_6$−, AsF$_6$−, ClO$_4$−, SO$_3$CF$_3$−, N(CF$_3$SO$_2$)$_2$−, C(CF$_3$SO$_2$)$_3$−, N(SO$_2$C$_2$F$_5$)$_2$, Al(OC (CF$_3$)$_3$)$_4$−, BAr$_4$−, or mixtures of anions thereof, where Ar is an aryl or fluorinated aryl group. In some embodiments, the anion is selected from a group comprising PF$_6$ or SO$_3$CF$_3$. For example, the anion may be tetraethylammonium hexafluorophosphate. The electrolyte crosslinker 50 may be one or more polyisocyanates, for example, selected from a group comprising Isocyanurate trimer of hexamethylene 1,6-diisocyanate, Tolylene-2,4-diisocyanate, 4,4'-Methylenebis(phenyl isocyanate), polymer of hexamethylene-1,6-diisocyanate, Covestro N3300A, Desmodur RC, Vestanat T1890/100, and Desmodur MR Mondur Light), the electrolyte polymer 52 may be a polyol copolymer with a molar ratio between 1/20 and 1/5 of 2-hydroxyethyl methacrylate and methyl acrylate, which is a polyol copolymer, and the electrolyte solvent 54 may be selected but not limited to a group comprising propylene carbonate, acetonitrile, γ-butyrolactone, γ-valerolactone or 3-methoxypropionitrile. In the electro-optic assembly 10, the electrolyte salt 48 flows between the anodic electro-optic film 44 and the cathodic electro-optic film 46 to balance the charge difference caused by electrons flowing in or out of the cathodic and anodic films 44, 46 from the first and second conductive layers 32, 34. The electrolyte crosslinker 50 forms a bond (i.e., a covalent bond) between the electrolyte crosslinker 50 and the electrolyte polymer 52. Each of the first electrolyte salt 48, the electrolyte crosslinker 50, and the electrolyte polymer 52 may initially be deposited in the electrolyte solvent 54 such that the electrolyte medium 30 is a homogenous mixture. As will be described in greater detail below, the electrolyte medium 30 may be backfilled into the cavity 28 after the seal 42 has been deposited and cured.

Figure 2:
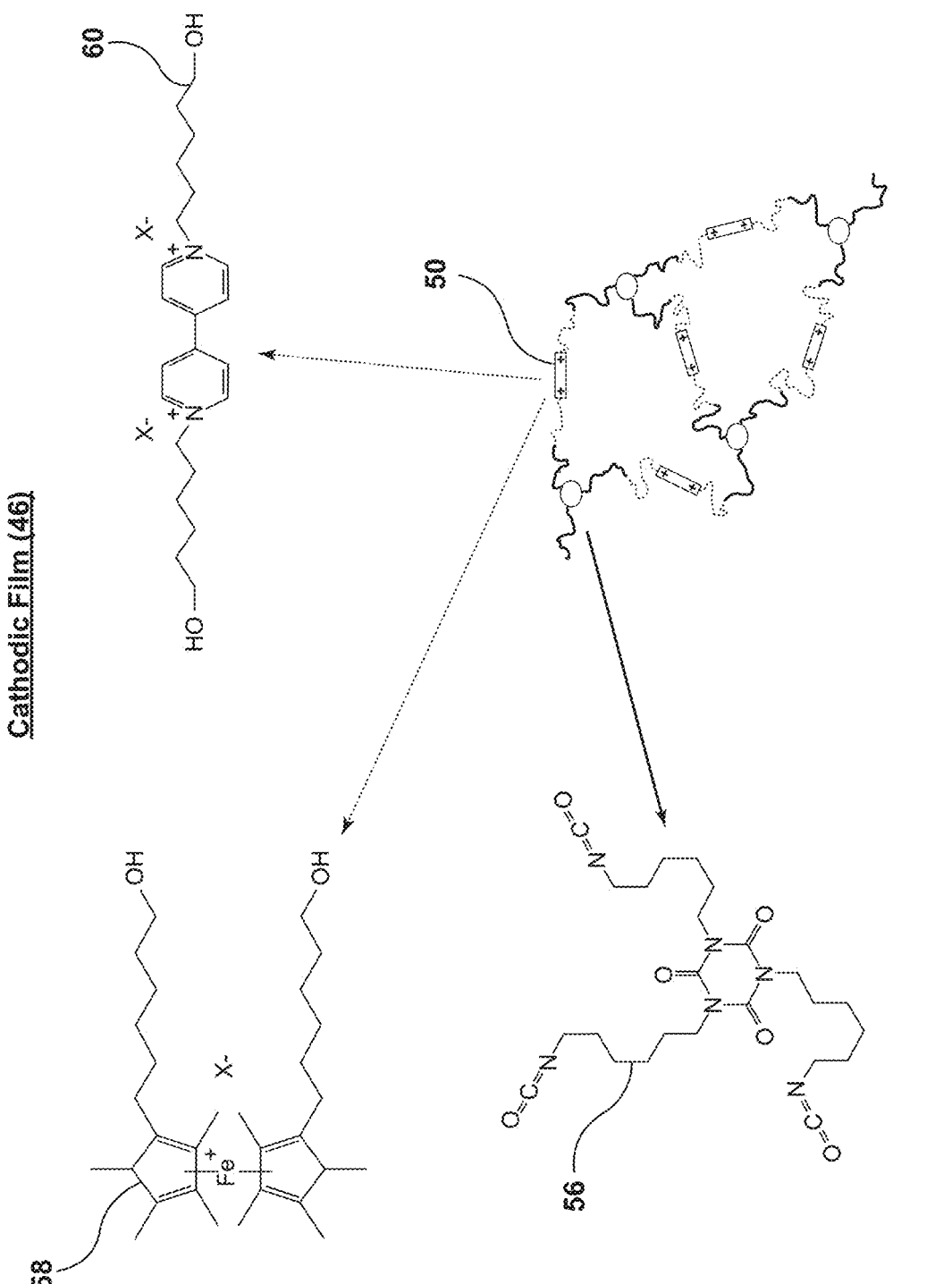
FIG. 2 is a schematic view of constituents of a cathodic electro-optic film in the electro-optic assembly according to an aspect of the present disclosure.
Figure 3:
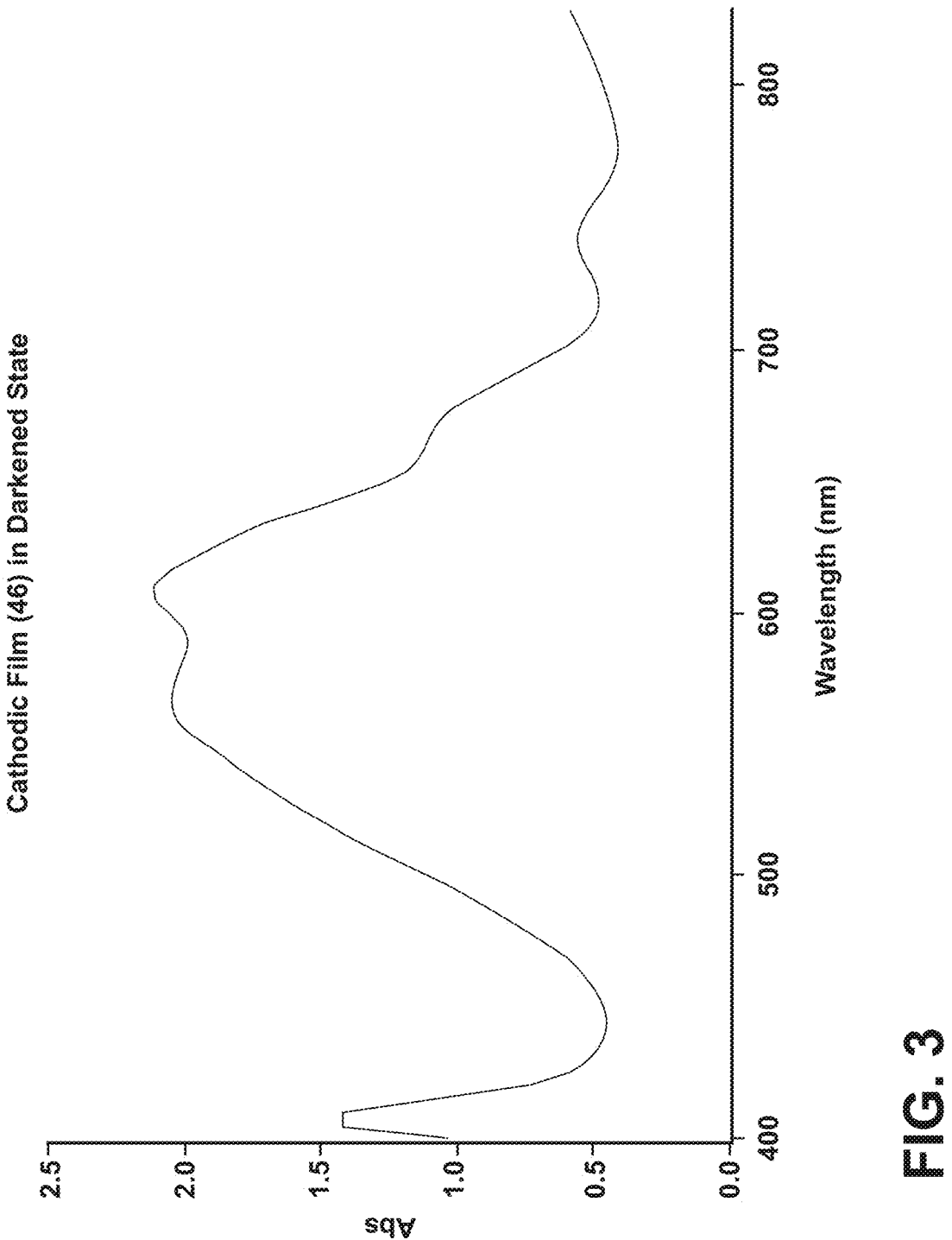
FIG. 3 is an absorption spectra of a cathodic film in a darkened state according to an aspect of the present disclosure.

With reference now to FIG. 2, material examples of the cathodic electro-optic film 46 are provided in accordance with various embodiments. The cathodic electro-optic film 46 may be formed with a polymer matrix film containing a crosslinker 56 (i.e., a second crosslinker), a cathodic redox buffer 58, and a first cathodic species 60. The crosslinker 56 includes polyisocyanate (e.g., Isocyanurate trimer of hexamethylene 1,6-diisocyanate, also referred to herein as "HDT"). The cathodic redox buffer 58 includes octamethyl dihexanol ferrocinium BF$_4$ salt, and the cathodic species is a viologen type chromophore 60 N,N'-bis(6-hydroxyhexyl)-4,4'-bypyridinium di(bis(trifluoromethane)sulfonimide) or 1,1'-Bis(hexanol)-4,4'-dipyridinium (NTF)$_2$. During curing, the crosslinker 56 forms a urethane bond (i.e., a covalent bond) between the molecules of the cathodic species 60. The cathodic redox buffer 58 stabilizes the cathodic electro-optic film 46 during redox reactions of the electro-optic assembly 10 by providing long-term thermal and cycling testing. FIG. 3 illustrates an absorption spectra of the cathodic film 46 in the darkened state. It should be appreciated that other cathodic species with similar absorption spectra and redox potentials may be substituted and that additional materials may be incorporated into the cathodic electro-optic film 46 prior to or post deposition, such as solvents (e.g., propylene carbonate, acetonitrile, γ-butyrolactone, γ-valerolactone, or 3-methoxypropionitrile), surfactants (e.g., TEGO Glide 410), and urethane catalysts (e.g., dibutyltin diacetate).

Figure 4:
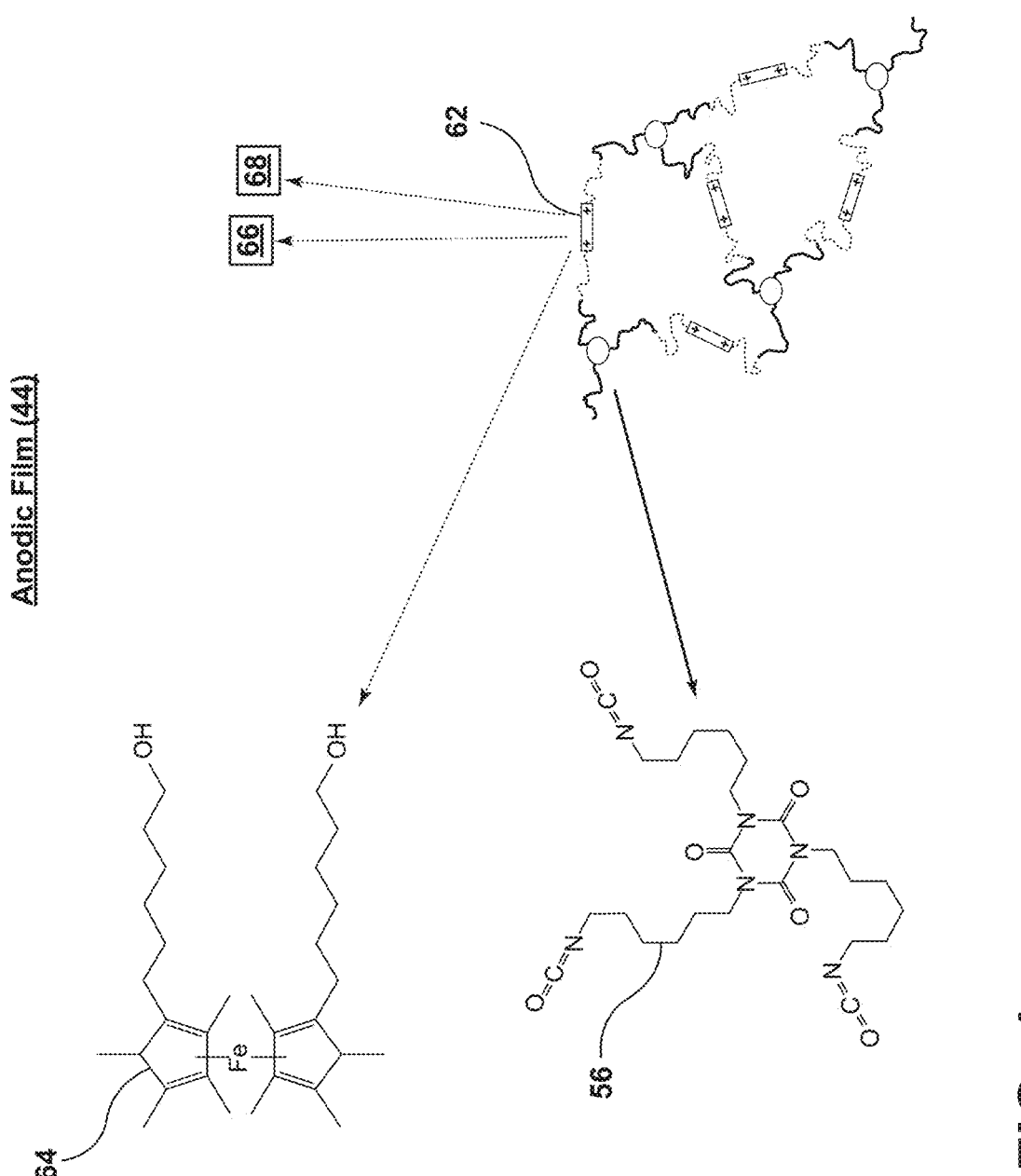
FIG. 4 is a schematic view of constituents of an anodic electro-optic film in the electro-optic assembly according to an aspect of the present disclosure.

With reference now to FIG. 4, material examples of the anodic electro-optic film 44 are provided in accordance with various embodiments. The anodic electro-optic film 44 may be formed with a polymer matrix film containing a crosslinker 62, an anodic redox buffer 64, a first variety (non-substituted) or "variety one" anodic species 66, and a second variety (substituted) or "variety two" anodic species 68. The crosslinker 62 includes one or more polyisocyanates (e.g., isocyanurate trimer of hexa methylene 1,6-diisocyanate, tolylene-2,4-diisocyanate, 4,4'-Methylenebis(phenyl isocyanate), polymer of hexamethylene-1,6-diisocyanate, Covestro N3300A, Desmodur RC, Vestanat T1890/100, and Desmodur MR Mondur Light). The anodic redox buffer 64 includes octamethyl dihexanol ferrocene, the first anodic species 66 includes a material selected from a first group of anodic species, and the second anodic species 68 includes a material selected from a second group of anodic species. In the electro-optic assembly 10, the crosslinker 62 forms a urethane bond (i.e., a covalent bond) between the molecules of the first anodic species 66 and the molecules of the second anodic species 68. The anodic redox buffer 64 consumes any excess oxidant species in the electro-optic assembly 10 which extends the operational lifetime of the electro-optic assembly 10 in thermal and cycling testing. The cathodic redox buffer 58, on the other hand, consumes excess reducing species in the electro-optic assembly 10 which further extends the lifetime of the electro-optic assembly 10. It should be appreciated that other anodic species with similar absorption spectra may be substituted and that additional materials may be incorporated into the anodic electro-optic film 44 prior to or post deposition, such as solvents (e.g., propylene carbonate and/or 3-methoxypropionitrile), surfactants (e.g., TEGO Glide 410), and urethane catalysts (e.g., dibutyltin diacetate).

Figure 5:
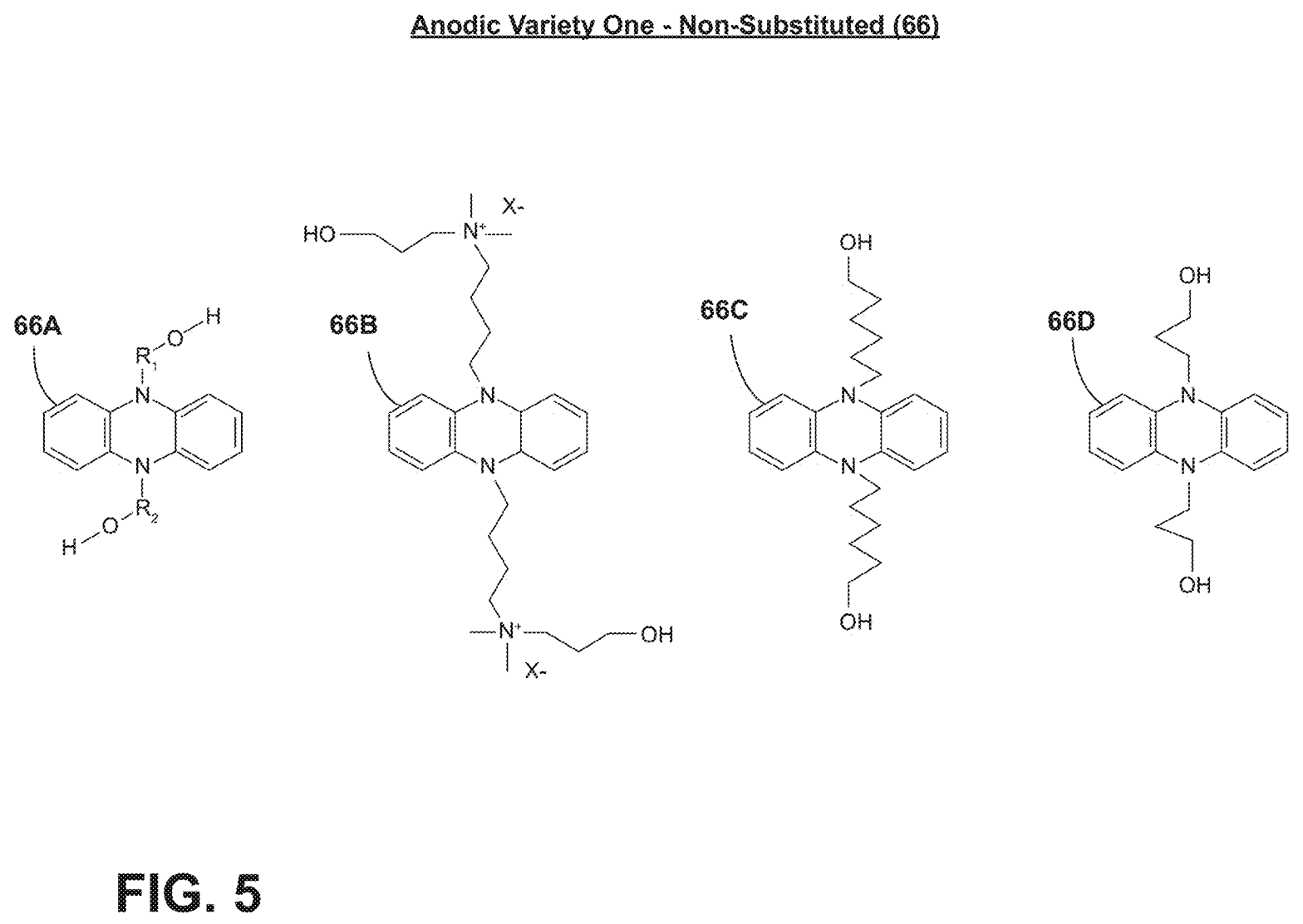

With reference now to FIG. 5, in some embodiments, the variety one anodic species 66 may be selected from one or more of the following first group of anodic species comprising:

(a) Variety one first anodic species 66A includes a 5,10-bis(hydroxyalkyl)-5,10-dihydrophenazine structure with $R_1$ and $R_2$ as the alkyl chains or alkyl chains with dimethylammonio groups in the chain and hydroxyl terminating groups;

(b) Variety one second anodic species 66B includes 5,10-bis[4-(3-hydroxypropyl dimethylammonio)butyl]-5,10-dihydrophenazine with a counterion indicated by "X";

(c) Variety one third anodic species 66C includes 5,10-bis(6-hydroxyhexyl)-5,10-dihydrophenazine; and (d) Variety one fourth anodic species 66D includes 5,10-bis(3-hydroxypropyl)-5,10-dihydrophenazine.

Figure 6:
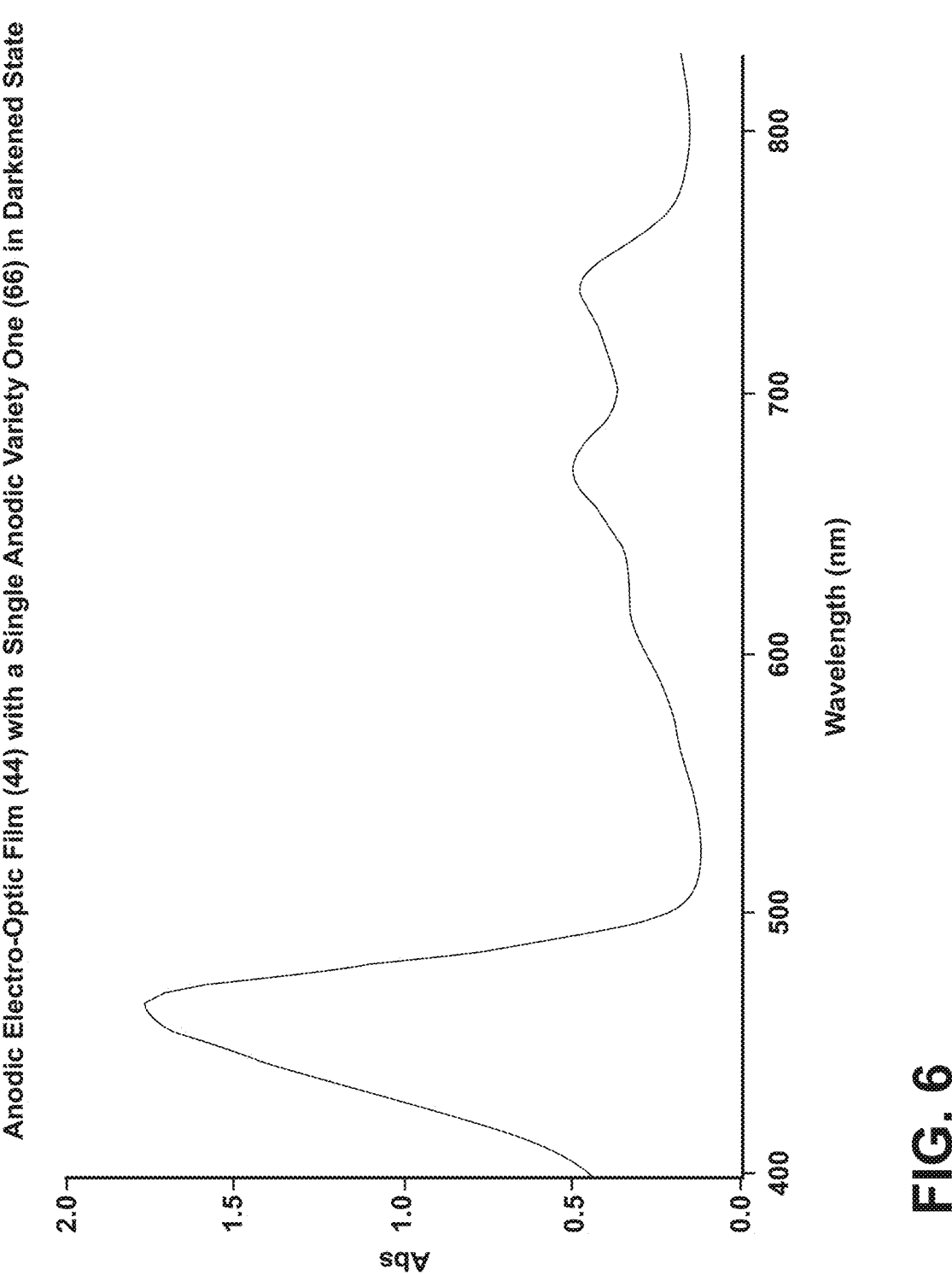
FIG. 6 is an absorption spectra of the anodic electro-optic film containing a single anodic species selected from the first variety of anodic species.
Figure 7:
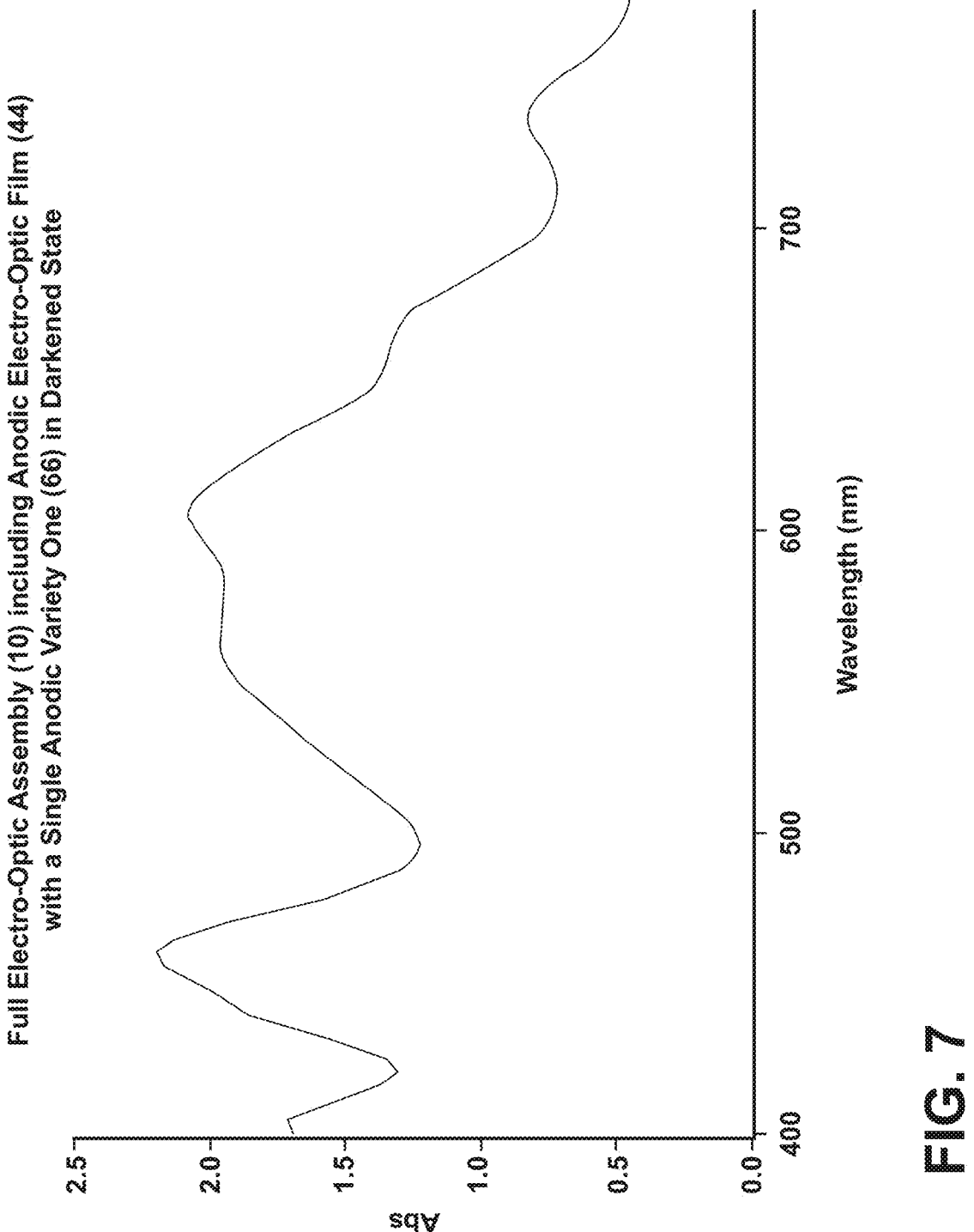
FIG. 7 is a darkened absorption spectra of the electro-optic assembly including the cathodic electro-optic film and the anodic electro-optic film that includes anodic species selected from the first variety of anodic species.

FIG. 6 illustrates an absorption spectra of the anodic electro-optic film 44 in the darkened state containing a single anodic species selected from the variety one anodic species across varying wavelengths in the electro-optic assembly 10. The variety one anodic species in this example includes 66B ($X=PF_6$). FIG. 7 illustrates an absorption spectra across the visible spectrum of electro-optic assembly 10 in the darkened state containing anodic electro-optic film 44 containing a single variety one compound including anodic species 66B ($X=PF_6$) and the cathodic electro-optic film 46. It should be appreciated that other anodic species with similar absorption spectra and redox potentials may be substituted.

Figure 8:
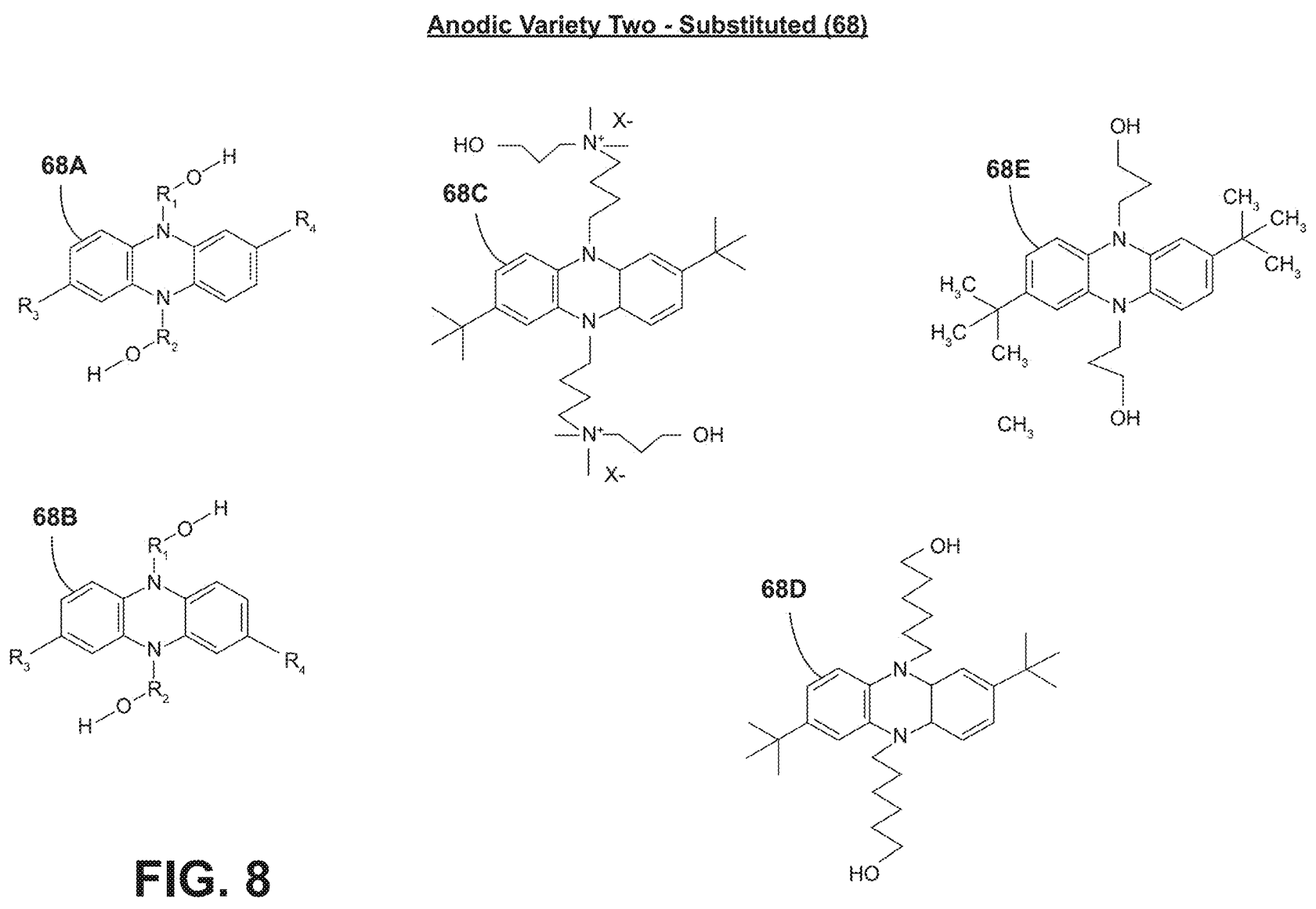

With reference now to FIG. 8, in some embodiments, the variety two anodic species 68 may be selected from one or more of the following second group of anodic species comprising:

(a) Variety two first anodic species 68A includes a 5,10-bis(hydroxyalkyl)-2,7-di(alkyl)-5,10-dihydrophenazine with $R_1$ and $R_2$ as the alkyl chains or alkyl chains with dimethylammonio groups in the chain and hydroxyl terminating groups and $R_3$ and $R_4$ alkyl groups;

(b) Variety two second anodic species (68B) includes a 5,10-bis(hydroxyalkyl)-2,8-di(alkyl)-5,10-dihydrophenazine with $R_1$ and $R_2$ as the alkyl chains or alkyl chains with dimethylammonio groups in the chain and hydroxyl terminating groups and $R_3$ and $R_4$ alkyl groups;

(c) Variety two third anodic species 68C includes 5,10-bis[4-(3-hydroxypropyldimethylammonio)butyl] 2,7-di(tert-butyl)-5,10-dihydrophenazine with a counterion indicated by X—;

(d) Variety two fourth anodic species 68D includes 5,10-bis(6-hydroxyhexyl)-2,7-di(tert-butyl)-5,10-dihydrophenazine; and (e) Variety two fifth anodic species 68E includes 5,10-bis(3-hydroxypropyl)-2,7-di(tert-butyl)-5,10-dihydrophenazine.

Figure 9:
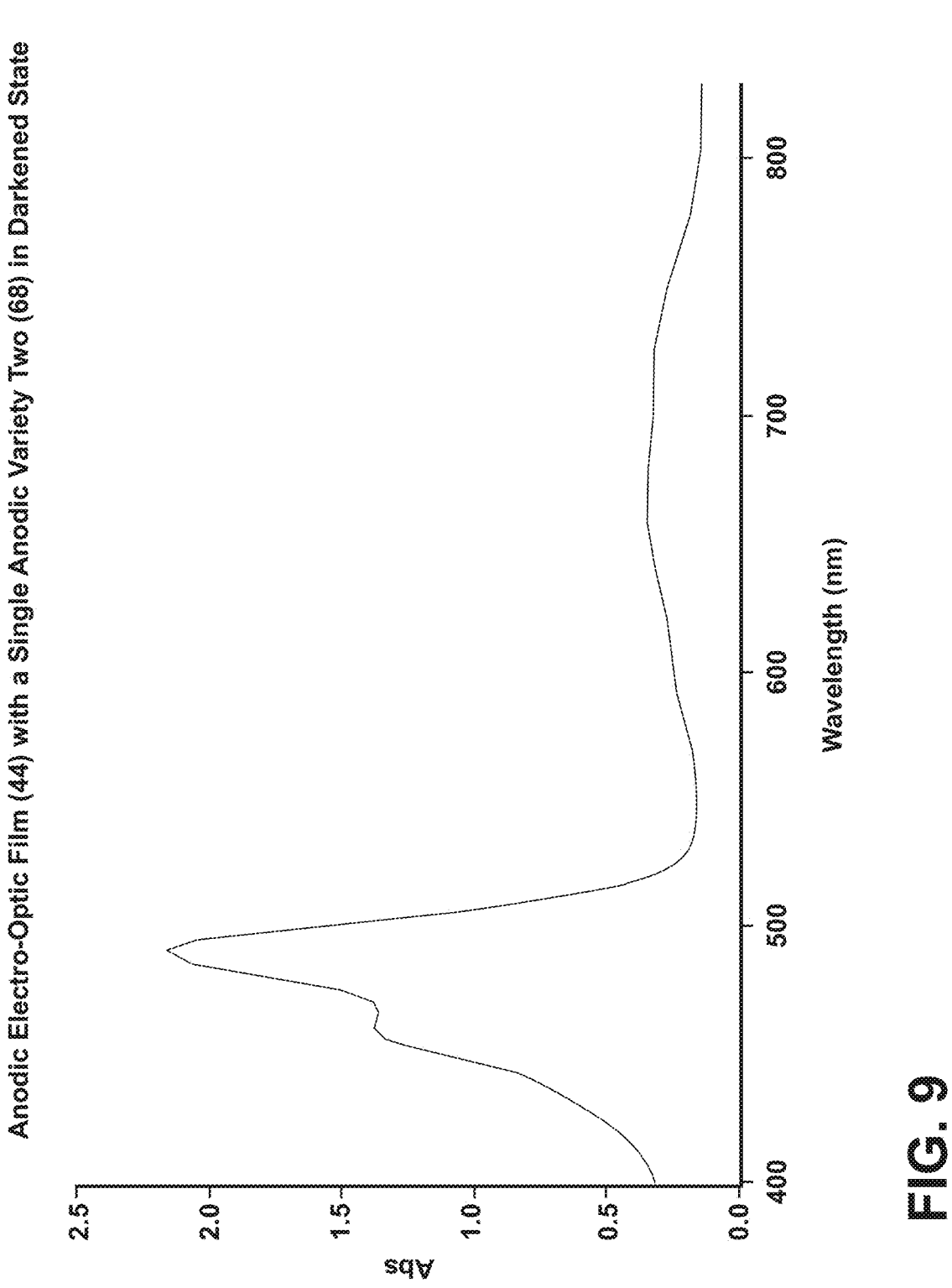
FIG. 9 is an absorption spectra of the anodic electro-optic film in the darkened state containing a single anodic species selected from the second variety of anodic species.
Figure 10:
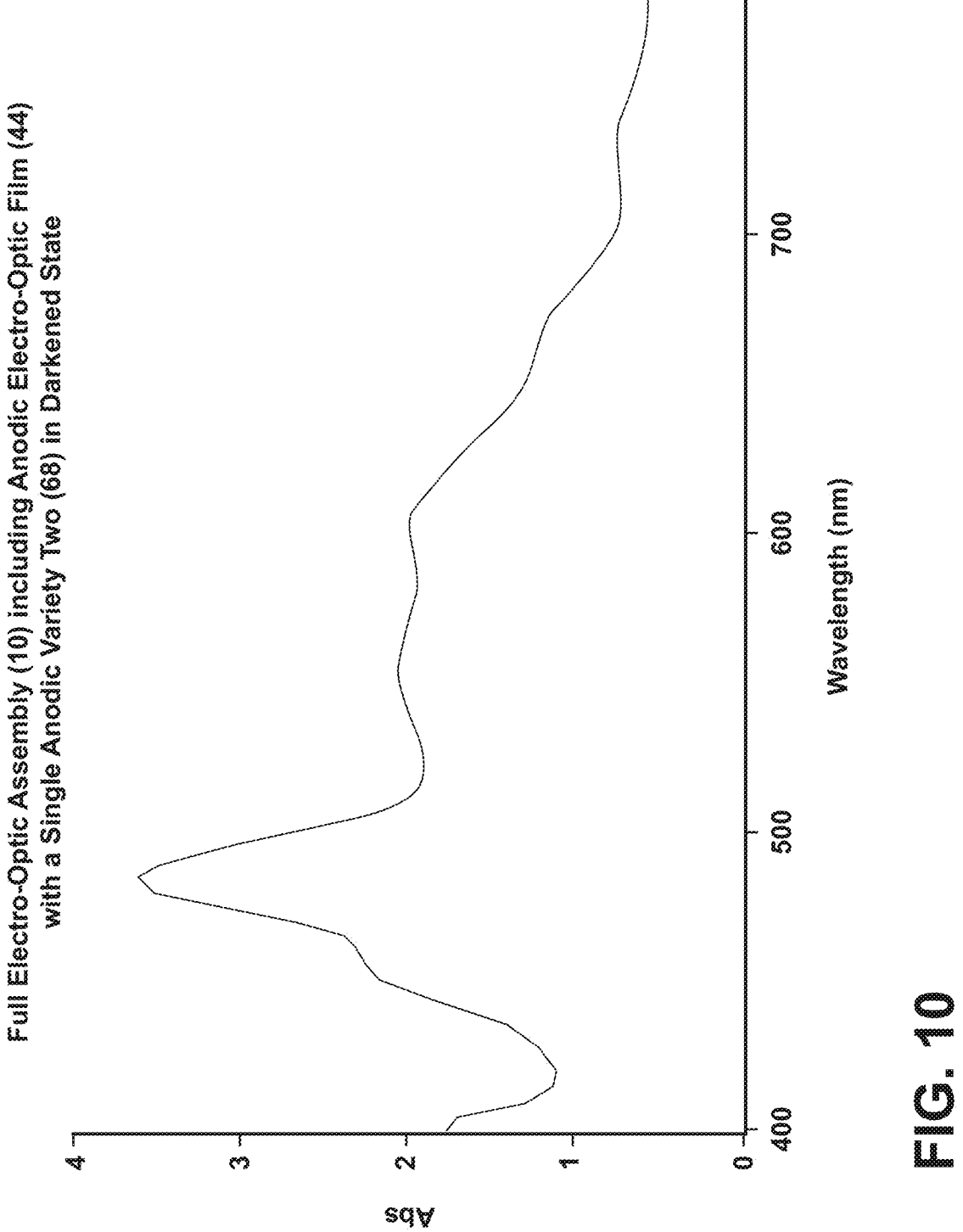
FIG. 10 is an absorption spectra of the electro-optic assembly in a darkened state including the cathodic electro-optic film and an anodic electro-optic film that includes a single anodic species selected from the second variety of anodic species.

FIG. 9 illustrates an absorption spectra of the anodic electro-optic film 44 in the darkened state containing a single anodic species selected from the variety two anodic species across varying wavelengths. The variety two compound, in this example, includes 68C ($X=PF_6$). FIG. 10 illustrates an absorption spectra across the visible spectrum of the electro-optic assembly 10 in the darkened state containing anodic electro-optic film 44 containing a single variety two anodic compound that includes 68C ($X=PF_6$) and the cathodic electro-optic film 46. It should be appreciated that other anodic species with similar absorption spectra and redox potentials may be substituted.

Figure 12:
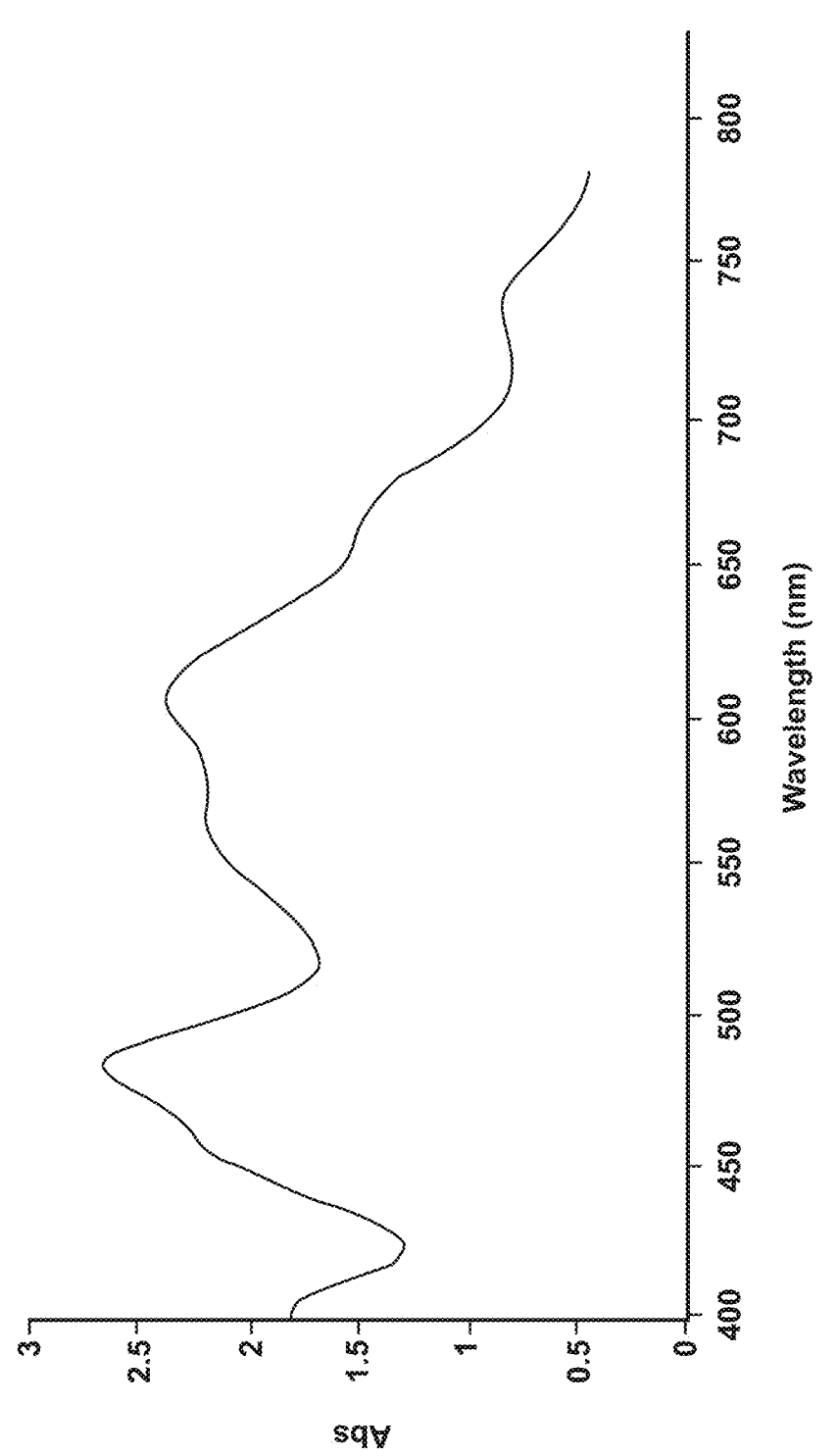
FIG. 12 is an absorption spectra of the electro-optic assembly in a darkened state with the anodic electro-optic film having the first variety of anodic species at a 60% molar ratio and the second variety of anodic species at a 40% molar ratio according to an aspect of the present disclosure.
Figure 13:
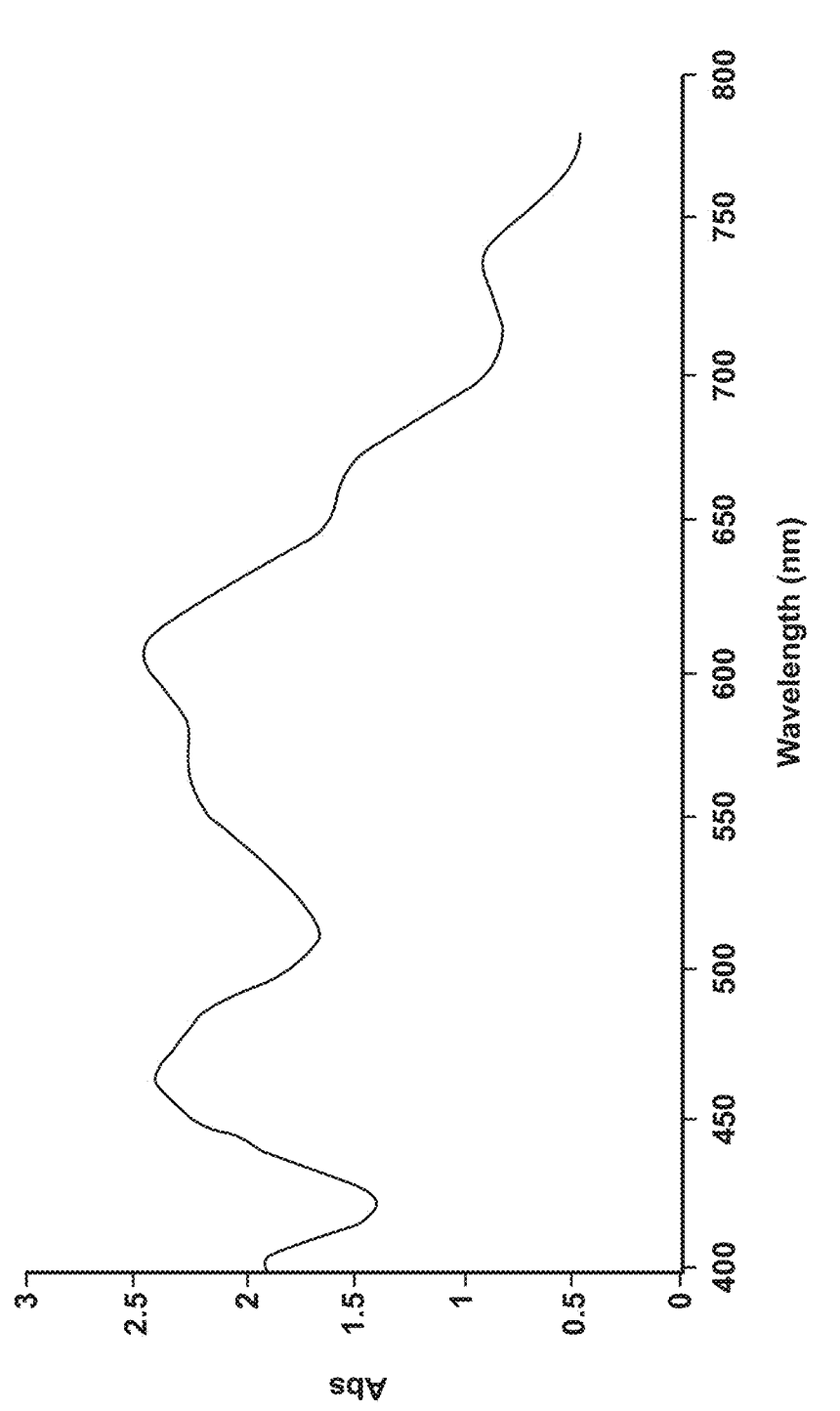
FIG. 13 is an absorption spectra of an electro-optic assembly with the anodic electro-optic film having the first variety of anodic species at an 80% molar ratio and the second variety of anodic species at a 20% molar ratio according to an aspect of the present disclosure.

FIG. 11 provides a specific example of formulations of the anodic electro-optic film 44 and the cathodic electro-optic film 46 prior to deposition. The formulations provide a wt. % of each constituent, and the first anodic species 66 comprises approximately 60% wt of the aggregate weight of the first anodic species 66 and the second anodic species 68, which is equivalent to 65% molar ratio between the first anodic species 66 and the second anodic species 68. FIG. 12 provides the absorption spectra of the electro-optic assembly 10 using a 60% molar ratio of the first anodic species 66 to 40% of the second anodic species 68. However, it should be appreciated that other molar ratios of the first anodic species 66 and the second anodic species 68 may be used. For example, the first anodic species 66 may comprise 90% or less, 80% or less, for example, 70% or less, 60% wt or more, 50% or more, between 70% and 60%, about 65%, 65%, or between 62% and 68% molar ratio. FIG. 13 provides the absorption spectra where the first anodic species 66 comprises approximately 80% of the aggregate moles of the first anodic species 66 and the second anodic species 68. It should be noted that the concentration of the first cathodic species 60 should be substantially uniform across the cathodic electro-optic film 46, which may be achieved by depositing the constituents of the cathodic electro-optic film 46 into a solvent and forming a homogenous mixture prior to deposition on the second conductive layer 34. Similarly, it should be noted that the molar ratio of the first anodic species 66 and the second anodic species 68 should be substantially uniform across the anodic electro-optic film 44, which may be achieved by depositing the constituents of the anodic electro-optic film 44 into a solvent and forming a homogenous mixture prior to deposition on the first conductive layer 32.

FIG. 14 provides a table summarizing performance metrics, where metrics are obtained from three electro-optic assembly 10 types at varying voltages from 0.4 to 0.7 V are compared. However, generally speaking, the varying voltages (i.e., applied voltage range) may be anywhere between 0.0 V and 1.0 V. The first device has only the variety one second anodic species 66B, which includes (5,10-bis[4-(3-hydroxypropyldimethylammonio)butyl]-5,10-dihydrophenazine bis(hexafluorophosphate), ($X=PF_6$)). A second device has only the variety two third anodic species 68C, which includes (5,10-bis[4-(3-hydroxypropyldimethylammonio)butyl] 2,7-di(tert-butyl)-5,10-dihydrophenazine bis (hexafluorophosphate) (X═PF$_6$)). The third electro-optic assembly in FIG. 14 has an anodic film with a 65:35 molar ratio of variety one to variety two anodic species of 66B (X═PF$_6$):68C(X═PF$_6$). It should be appreciated that the third electro-optic assembly in FIG. 14 exhibits a much smaller shift of both a* and b* across applied voltages while maintaining similar transmission states.

FIG. 15 provides a color excursion graph of the clear to fully dark transition, where metrics are obtained from the three electro-optic assemblies 10 from FIG. 14. It should be appreciated that the electro-optic assembly 10 includes 65:35 molar ratio of anodic species 66B(X═PF$_6$):68C (X═PF$_6$) and exhibits a much smaller color excursion of both a* and b* during the transition and in the fully darkened state.

FIG. 16 provides another color excursion graph of the third electro-optic assembly 10 in FIG. 14 across a variety of applied voltages. The color excursion graph of an intermediate darkening state where metrics are obtained from the electro-optic assembly 10 with 65:35 molar ratio of anodic species 66B(X═PF$_6$):68C(X═PF$_6$). The electro-optic assembly 10 stays in a narrow color range even at intermediate states and the fully darkened state.

FIG. 17 provides another example of a color excursion for a 10% low-end transmission part that maintains a color from 86% to 10% transmission range. The electro-optic assembly 10 includes an anodic mixture of 65:35 molar ratio of anodic species 66B(X═SO$_3$CF$_3$):68C(X═SO$_3$CF$_3$). The electro-optic assembly 10 maintains color from −4 to 4 in a* and b* in the entire transition of the device from clear to dark (1) and back to clear (2). The arrows indicate the direction from clear to dark for curve (1) and from dark to clear for curve (2).

The disclosure also provides a method of assembling the electro-optic assembly 10. The method includes coating the cathodic electro-optic film 46 on the second substrate 20 with a meyer rod. The method may further include leveling the cathodic electro-optic film 46 to obtain a uniform coating thickness across the second substrate 20. The method may further include curing the cathodic electro-optic film 46 (e.g., in a 60° C. oven). The method may also include removing an edge of the cathodic electro-optic film 46 and then observing (e.g., via a readable machine) the cathodic electro-optic film 46 for uniform thickness. The method may further include coating the first substrate 12 with the anodic electro-optic film 44. The method may also include similar additional steps for the anodic electro-optic film as those described above in reference to the cathodic electro-optic film. The method may further include placing the seal 42 around the perimeter of the anodic electro-optic film 44 and the cathodic electro-optic film 46 and curing the partially assembled electro-optic assembly 10 (e.g., in a 60° C. oven). The method may also include depositing the electrolyte medium 30 into the cavity 28. The method may further include curing (e.g., in an oven) the assembled electro-optic assembly 10.

The invention disclosed herein is further summarized in the following paragraphs and is further characterized by combinations of any and all of the various aspects described therein.

According to one aspect of the present disclosure, an electro-optic assembly includes a first substrate that has a first and a second surface disposed on opposite sides thereof and a second substrate that has a third and a fourth surface disposed on opposite sides thereof. The second substrate is disposed in a substantially parallel spaced apart relationship with the first substrate such that the second and third surfaces face one another. A first conductive layer is disposed on the second surface and a second conductive layer is disposed on the third surface. A cathodic electro-optic film is in contact with the second conductive layer and includes a cathodic species. An anodic electro-optic film is in contact with the first conductive layer. The anodic electro-optic film includes a plurality of anodic species mixed at a molar ratio that is configured to generally maintain an a* value and a b* value of the electro-optic assembly both staying between −8 and 8 between a high-end transmission state and a fully darkened state caused by an applied voltage range. An electrolyte medium is disposed between the cathodic and anodic electro-optic films.

According to another aspect of the present disclosure, a plurality of anodic species includes a first anodic species and a second anodic species, where the first anodic species comprises a molar percentage between 80% and 60% of an aggregation of the first anodic species and the second anodic species.

According to yet another aspect of the present disclosure, a first anodic species is selected from a variety one (non-substituted) group of anodic species that includes a non-substituted phenazine compound. The variety one (non-substituted) group of anodic species comprises a) 5,10-bis [(hydroxyalkyl dimethylammonio)alkyl]-5,10-dihydrophenazine and b) 5,10-bis(hydroxyalkyl)-5,10-dihydrophenazine.

According to still another aspect of the present disclosure, a first anodic species is selected from a variety one (non-substituted) group of anodic species that includes a) 5,10-bis[4-(3-hydroxypropyl dimethylammonio)butyl]-5,10-di-hydrophenazine and b) 5,10-bis(6-hydroxyhexl)-5,10-dihydrophenazine.

According to another aspect of the present disclosure, a second anodic species is selected from a variety two (substituted) group of anodic species that includes substituted alkyl groups in the 2 and 7 or 2 and 8 position of a non-substituted phenazine compound. The variety two (substituted) group of anodic species includes a) 5,10-bis[(hydroxyalkyl dimethylammonio)alkyl] 2,7-bis(alkyl)-5,10-di-hydrophenazine; b) 5,10-bis(hydroxyalkyl)-2,7-bis(alkyl)-5,10-dihydrophenazine; c) 5,10-bis[(hydroxyalkyl dimethylammonio)alkyl] 2,8-bis(alkyl)-5,10-dihydro-phenazine; and d) 5,10-bis(hydroxyalkyl)-2,8-bis(alkyl)-5,10-dihydrophenazine.

According to yet another aspect of the present disclosure, a second anodic species is selected from a variety two (substituted) group of anodic species that includes substituted butyl groups in the 2 and 7 or 2 and 8 position of a non-substituted phenazine compound. The variety two (substituted) group of anodic species includes a) 5,10-bis[4-(3-hydroxypropyl dimethylammonio)butyl] 2,7-di(tert-butyl)-5,10-dihydrophenazine; b) 5,10-bis[4-(3-hydroxypropyl dimethylammonio)butyl] 2,8-di(tert-butyl)-5,10-dihydro-phenazine; c) 5,10-bis(6-hydroxyhexyl)-2,7-di(tert-butyl)-5,10-dihydrophenazine; and d) 5,10-bis(6-hydroxyhexyl)-2,8-di(tert-butyl)-5,10-dihydrophenazine.

According to still another aspect of the present disclosure, a phenazine compound is an ammonium salt with an anion comprising at least one of F$^-$, Cl$^-$, Br$^-$, I$^-$, BF$_4$$^-$, PF$_6$$^-$, SbF$_6$$^-$, AsF$_6$$^-$, ClO$_4$$^-$, SO$_3$CF$_3$$^-$, N(CF$_3$SO$_2$)$_2$$^-$, C(CF$_3$SO$_2$)$_3$$^-$, N(SO$_2$C$_2$F$_5$)$_2$$^-$, Al(OC(CF$_3$)$_3$)$_4$$^-$, BAr$_4$$^-$, PF$_6$$^-$ and SO$_3$CF$_3$, or a mixture of anions thereof where Ar is an aryl or fluorinated aryl group.

According to another aspect of the present disclosure, a cathodic electro-optic film includes a crosslinker bonding molecules of the cathodic species into a polymer matrix.

According to yet another aspect of the present disclosure, an anodic electro-optic film includes a crosslinker bonding the molecules of a first anodic species and the molecules of a second anodic species into a polymer matrix.

According to still another aspect of the present disclosure, an applied voltage range is between 0.0 V and 1.0 V.

According to another aspect of the present disclosure, a transmission state of an electro-optic assembly changes between at least 75% at a high-end transmission state to less than 30% at a fully darkened state.

According to still another aspect of the present disclosure, a first anodic species and a second anodic species each include a first redox potential that is within a 200 mV range.

According to another aspect of the present disclosure, a molar ratio is further configured to maintain a total color excursion of an a* value and a b* value both between −8 and 8 throughout the applied voltage range.

According to yet another aspect of the present disclosure, a molar ratio is further configured to maintain a total color excursion of an a* value and a b* value both between −6 and 6 throughout an applied voltage range.

According to still another aspect of the present disclosure, a molar ratio is further configured to maintain a total color excursion of an a* value and a b* value both between −4 and 4 throughout an applied voltage range.

According to another aspect of the present disclosure, a cathodic electro-optic film includes a crosslinker, an anodic electro-optic film contains a crosslinker, and an electrolyte medium contains an electrolyte crosslinker and an electrolyte polymer.

According to yet another aspect of the present disclosure, a cathodic species is a viologen.

According to another aspect of the present disclosure, an electro-optic assembly includes a first substrate that has a first and a second surface disposed on opposite sides thereof and a second substrate that has a third and a fourth surface disposed on opposite sides thereof. The second substrate is disposed in a substantially parallel spaced apart relationship with the first substrate such that the second and third surfaces face one another. A first conductive layer is disposed on the second surface and a second conductive layer is disposed on the third surface. A cathodic electro-optic film is in contact with the second conductive layer and includes a cathodic species. An anodic electro-optic film is in contact with the first conductive layer. The anodic electro-optic film includes a plurality of anodic species mixed at a molar ratio that is configured to generally maintain an a* value and a b* value of the electro-optic assembly both staying between −8 and 8 between a high-end transmission state and a fully darkened state caused by an applied voltage range. The plurality of anodic species includes a first anodic species and a second anodic species, where the first anodic species comprises the molar percentage between 80% and 60% of an aggregation of the first anodic species and the second anodic species. An electrolyte medium is disposed between the cathodic and anodic electro-optic films.

According to another aspect of the present disclosure, a first anodic species includes 5,10-bis[4-(3-hydroxypropyl dimethylammonio)butyl]-5,10-dihydrophenazine with a counterion.

According to yet another aspect of the present disclosure, a second anodic species includes 5,10-bis[4-(3-hydroxypro-pyldimethylammonio)butyl] 2,7-di(tert-butyl)-5,10-dihy-drophenazine with a counterion.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connectors or other elements of the system may be varied, or the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. An electro-optic assembly, comprising:
a first substrate having a first and a second surface disposed on opposite sides thereof;
a second substrate having a third and a fourth surface disposed on opposite sides thereof, the second substrate disposed in a substantially parallel spaced apart relationship with the first substrate such that the second and third surfaces face one another;
a first conductive layer disposed on the second surface;
a second conductive layer disposed on the third surface;

a cathodic electro-optic film in contact with the second conductive layer and including a cathodic species;

an anodic electro-optic film in contact with the first conductive layer, the anodic electro-optic film including a homogenous layer with uniform concentrations of a plurality of anodic species, the plurality of anodic species mixed at a molar ratio that is configured to generally maintain an a* value and a b* value of the electro-optic assembly both staying between −8 and 8 between a high-end transmission state and a fully darkened state caused by an applied voltage range; and an electrolyte medium disposed between the cathodic and anodic electro-optic films; and wherein the first anodic species is selected from a variety one group of non-substituted anodic species selected from a group consisting of:

(a) 5,10-bis[(hydroxyalkyl dimethylammonio)alkyl]-5, 10-dihydrophenazine including a non-substituted phenazine compound;

(b) 5,10-bis(hydroxyalkyl)-5,10-dihydrophenazine including a non-substituted phenazine compound;

(c) 5,10-bis[4-(3-hydroxypropyl dimethylammonio) butyl]-5,10-dihydrophenazine; and (d) 5,10-bis(6-hydroxyhexl)-5,10-dihydrophenazine.

2. The electro-optic assembly of claim 1, wherein the plurality of anodic species includes a first anodic species and a second anodic species, wherein the first anodic species comprises the molar percentage between 80% and 60% of an aggregation of the first anodic species and the second anodic species.

3. The electro-optic assembly of claim 2, wherein the second anodic species is selected from a variety two group of substituted anodic species comprising substituted alkyl groups in the 2 and 7 or 2 and 8 position of a non-substituted phenazine compound, the variety two group of substituted anodic species selected from a group consisting:

(a) 5,10-bis[(hydroxyalkyl dimethylammonio)alkyl] 2,7-bis(alkyl)-5,10-dihydrophenazine;

(b) 5,10-bis(hydroxyalkyl)-2,7-bis(alkyl)-5,10-dihydro-phenazine;

(c) 5,10-bis[(hydroxyalkyl dimethylammonio)alkyl] 2,8-bis(alkyl)-5,10-dihydrophenazine; and (d) 5,10-bis(hydroxyalkyl)-2,8-bis(alkyl)-5,10-dihydro-phenazine.

4. The electro-optic assembly of claim 3, wherein the phenazine compound is an ammonium salt with an anion selected from a group consisting of F⁻, Cl⁻, Br⁻, I⁻, BF₄⁻, PF₆⁻, SbF₆⁻, AsF₆⁻, ClO₄⁻, SO₃CF₃⁻, N(CF₃SO₂)₂⁻, C(CF₃SO₂)₃⁻, N(SO₂C₂F₅)₂⁻, Al(OC(CF₃)₃)₄, BAr₄⁻, PF₆⁻ and SO3CF3, and a mixture of anions thereof where Ar is an aryl or fluorinated aryl group.

5. The electro-optic assembly of claim 2, wherein the second anodic species is selected from a variety two group of substituted anodic species comprising substituted butyl groups in the 2 and 7 or 2 and 8 position of a non-substituted phenazine compound, the variety two group of substituted anodic species selected from a group consisting of:

(a) 5,10-bis[4-(3-hydroxypropyl dimethylammonio) butyl] 2,7-di(tert-butyl)-5,10-dihydrophenazine;

(b) 5,10-bis[4-(3-hydroxypropyl dimethylammonio) butyl] 2,8-di(tert-butyl)-5,10-dihydrophenazine;

(c) 5,10-bis(6-hydroxyhexyl)-2,7-di(tert-butyl)-5,10-di-hydrophenazine; and (d) 5,10-bis(6-hydroxyhexyl)-2,8-di(tert-butyl)-5,10-di-hydrophenazine.

6. The electro-optic assembly of claim 5, wherein the phenazine compound is an ammonium salt with an anion selected from a group consisting of F⁻, Cl⁻, Br⁻, I⁻, BF₄⁻, PF₆⁻, SbF₆⁻, AsF₆⁻, ClO₄⁻, SO₃CF₃⁻, N(CF₃SO₂)₂⁻, C(CF₃SO₂)₃⁻, N(SO₂C₂F₅)₂⁻, Al(OC(CF₃)₃)₄⁻, BAr₄⁻, PF₆⁻ and SO3CF3, and a mixture of anions thereof, where Ar is an aryl or fluorinated aryl group.

7. The electro-optic assembly of claim 2, wherein the anodic electro-optic film includes a crosslinker bonding molecules of the first anodic species and molecules of the second anodic species into a polymer matrix.

8. The electro-optic assembly of claim 2, wherein the first anodic species and the second anodic species each include a first redox potential that is within a 200 mV range.

9. The electro-optic assembly of claim 1, wherein the cathodic electro-optic film includes a crosslinker bonding molecules of the cathodic species into a polymer matrix.

10. The electro-optic assembly of claim 1, wherein the applied voltage range is between 0.0 V and 1.0 V.

11. The electro-optic assembly of claim 1, wherein a transmission state of the electro-optic assembly changes between at least 75% at the high-end transmission state to less than 30% at the fully darkened state.

12. The electro-optic assembly of claim 1, wherein the molar ratio is further configured to maintain a total color excursion of the a* value and the b* value both between −8 and 8 throughout the applied voltage range.

13. The electro-optic assembly of claim 12, wherein the molar ratio is further configured to maintain the total color excursion of the a* value and the b* value both between −6 and 6 throughout the applied voltage range.

14. The electro-optic assembly of claim 13, wherein the molar ratio is further configured to maintain the total color excursion of the a* value and the b* value both between −4 and 4 throughout the applied voltage range.

15. The electro-optic assembly of claim 1, wherein the anodic electro-optic film contains a first crosslinker, the cathodic electro-optic film includes a second crosslinker, and the electrolyte medium contains an electrolyte cross-linker and an electrolyte polymer.

16. The electro-optic assembly of claim 1, wherein the cathodic species is a viologen.

17. An electro-optic assembly, comprising:

a first substrate having a first and a second surface disposed on opposite sides thereof;

a second substrate having a third and a fourth surface disposed on opposite sides thereof, the second substrate disposed in a substantially parallel spaced apart relationship with the first substrate such that the second and third surfaces face one another;

a first conductive layer disposed on the second surface;

a second conductive layer disposed on the third surface;

a cathodic electro-optic film in contact with the second conductive layer and including a cathodic species;

an anodic electro-optic film in contact with the first conductive layer, the anodic electro-optic film including a plurality of anodic species, the plurality of anodic species mixed at a molar ratio that is configured to generally maintain an a* value and a b* value of the electro-optic assembly both staying between −8 and 8 between a high-end transmission state and a fully darkened state caused by an applied voltage range;

the plurality of anodic species includes a first anodic species and a second anodic species, wherein the first anodic species comprises the molar percentage between 80% and 60% of an aggregation of the first anodic species and the second anodic species; and an electrolyte medium disposed between the cathodic and anodic electro-optic films; and wherein the second anodic species is selected from a variety two group of substituted anodic species comprising substituted alkyl groups in the 2 and 7 or 2 and 8 position of a non-substituted phenazine compound or substituted butyl groups in the 2 and 7 or 2 and 8 position of a non-substituted phenazine compound, the variety two group of substituted anodic species selected from a group consisting:

(a) 5,10-bis[(hydroxyalkyl dimethylammonio)alkyl] 2,7-bis(alkyl)-5,10-dihydrophenazine;

(b) 5,10-bis(hydroxyalkyl)-2,7-bis(alkyl)-5,10-dihydrophenazine;

(c) 5,10-bis[(hydroxyalkyl dimethylammonio)alkyl] 2,8-bis(alkyl)-5,10-dihydrophenazine;

(d) 5,10-bis(hydroxyalkyl)-2,8-bis(alkyl)-5,10-dihydrophenazine;

(e) 5,10-bis[4-(3-hydroxypropyl dimethylammonio) butyl] 2,7-di(tert-butyl)-5,10-dihydrophenazine;

(f) 5,10-bis[4-(3-hydroxypropyl dimethylammonio)butyl] 2,8-di(tert-butyl)-5,10-dihydrophenazine;

(g) 5,10-bis(6-hydroxyhexyl)-2,7-di(tert-butyl)-5,10-dihydrophenazine; and (h) 5,10-bis(6-hydroxyhexyl)-2,8-di(tert-butyl)-5,10-dihydrophenazine.

18. The electro-optic assembly of claim 17, wherein the first anodic species includes 5,10-bis[4-(3-hydroxypropyl dimethylammonio)butyl]-5,10-dihydrophenazine with a counterion.

19. The electro-optic assembly of claim 18, wherein the second anodic species includes 5,10-bis[4-(3-hydroxypropyldimethylammonio)butyl] 2,7-di(tert-butyl)-5,10-dihydrophenazine with a counterion.

* * * * *